(12) United States Patent
Fujinaka et al.

(10) Patent No.: US 9,294,696 B2
(45) Date of Patent: Mar. 22, 2016

(54) SOLID-STATE IMAGING DEVICE HAVING A COUNTING UNIT AND A COMPARISON UNIT WITH SWITCHABLE FREQUENCY BAND CHARACTERISTICS AND IMAGING APPARATUS HAVING THE SAME

(71) Applicant: PANASONIC CORPORATION, Osaka (JP)

(72) Inventors: Hiroshi Fujinaka, Osaka (JP); Yutaka Abe, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 143 days.

(21) Appl. No.: 14/281,507

(22) Filed: May 19, 2014

(65) Prior Publication Data

US 2014/0252208 A1 Sep. 11, 2014

Related U.S. Application Data

(63) Continuation of application No. PCT/JP2012/006892, filed on Oct. 26, 2012.

(30) Foreign Application Priority Data

Nov. 25, 2011 (JP) .................................. 2011-257530

(51) Int. Cl.
| | |
|---|---|
| H04N 5/378 | (2011.01) |
| H04N 5/357 | (2011.01) |
| H04N 5/363 | (2011.01) |
| H04N 5/365 | (2011.01) |

(52) U.S. Cl.
CPC .............. *H04N 5/357* (2013.01); *H04N 5/363* (2013.01); *H04N 5/365* (2013.01); *H04N 5/378* (2013.01)

(58) Field of Classification Search
CPC ...... H04N 5/378; H04N 5/357; H04N 5/3742

USPC ................. 250/208.1, 214 R; 348/294–311; 257/290–292, 440–444
See application file for complete search history.

(56) References Cited

U.S. PATENT DOCUMENTS

| | | | |
|---|---|---|---|
| 8,922,668 B2* | 12/2014 | Ota | H04N 5/357 348/222.1 |
| 2009/0251579 A1 | 10/2009 | Schrey et al. | |
| 2011/0037868 A1 | 2/2011 | Ota | |
| 2012/0320246 A1 | 12/2012 | Ikuma et al. | |

FOREIGN PATENT DOCUMENTS

| | | |
|---|---|---|
| JP | 10-164442 A | 6/1998 |
| JP | 2009-538074 A | 10/2009 |
| JP | 2011-041091 A | 2/2011 |
| JP | 2011-182065 A | 9/2011 |
| WO | 2007/135161 A1 | 11/2007 |

OTHER PUBLICATIONS

International Search Report issued in International Application No. PCT/JP2012/006892 with Date of mailing Dec. 4, 2012, with English Translation.

* cited by examiner

*Primary Examiner* — Que T Le

(74) *Attorney, Agent, or Firm* — McDermott Will & Emery LLP

(57) ABSTRACT

A solid-state imaging device includes the following. Pixels arranged in matrix converts received light into signal voltage. A column AD conversion unit, which includes a comparison unit and an up-down counting unit, converts signal voltage to digital signal. The comparison unit compares a value of signal voltage to a gradually changing value of reference signal voltage. The up-down counting unit counts, by one of down-counting and up-counting, a time period until the comparison result is reversed if the signal voltage is of a base signal component of each pixel at reset level, and counts, by an other of down-counting and up-counting, the time period if the signal voltage is of a superimposed signal component in which the base signal component is superimposed on a pixel signal component corresponding to an amount of light received by the pixel. The comparison unit has switchable kinds of frequency band characteristics.

10 Claims, 8 Drawing Sheets

SOLID-STATE IMAGING DEVICE HAVING A COUNTING UNIT AND A COMPARISON UNIT WITH SWITCHABLE FREQUENCY BAND CHARACTERISTICS AND IMAGING APPARATUS HAVING THE SAME

CROSS REFERENCE TO RELATED APPLICATIONS

This is a continuation application of PCT International Application No. PCT/JP2012/006892 filed on Oct. 26, 2012, designating the United States of America, which is based on and claims priority of Japanese Patent Application No. 2011-257530 filed on Nov. 25, 2011. The entire disclosures of the above-identified applications, including the specifications, drawings and claims are incorporated herein by reference in their entirety.

FIELD

The present disclosure relates to solid-state imaging devices and imaging apparatuses having the same.

BACKGROUND

For Analog to Digital (AD) conversion of Metal-Oxide-Semiconductor (MOS) image sensors, so-called single-slope AD conversion circuits have been used. The single-slope AD conversion circuits convert a gradually changing analog value of a reference signal voltage to a digital signal value according to information regarding a time period from when the reference signal voltage is generated to when a value relationship between the reference signal voltage and a signal voltage is changed.

Referring to FIG. 9, the following describes a structure of a conventional solid-state imaging device disclosed in Patent Literature 1. The conventional solid-state imaging device includes single-slope AD conversion circuits provided for respective columns of pixels.

As illustrated in FIG. 9, a solid-state imaging device 1001 includes a pixel array 1010 where a plurality of pixels 1003 are arrayed in rows and columns (in other words, two-dimensionally arrayed in a matrix). Each of the pixels 1003 includes a light-receiving element (an example of an electric charge generation unit) that outputs a signal corresponding to an amount of incident light. Thereby, each of the pixels 1003 outputs a signal voltage. The solid-state imaging device 1001 includes Analog Digital Converters (ADCs) each provided to a corresponding one of the columns of the pixels 1003.

More specifically, in the solid-state imaging device 1001, outside the pixel array 1010, there are provided: a drive control unit including a vertical scan circuit 1014, a timing control circuit 1020, and a horizontal scan circuit 1012; and a column processing unit 1026 including column AD circuits 1025 each provided to a corresponding one of the columns; a reference voltage generation unit 1027 that supplies a plurality of reference signal voltages Vref1 and Vref2 to the column processing unit 1026 to be used in AD conversion.

Each of the column AD circuits 1025 includes a voltage comparison unit 1252, a counter/data storage unit 1254, an AD conversion selection circuit 1253, a switch 1255, a switch 1256, and a capacitance 1257.

The drive control unit has a control circuit function of sequentially reading signals from the pixel array 1010. For example, the drive control unit includes the horizontal scan circuit (column scan circuit) 1012 that controls column addresses and column scanning; the vertical scan circuit (row scan circuit) 1014 that controls row addresses and row scanning; and the timing control circuit 1020 having a function of generating an internal clock.

Each of the pixels 1003 is connected to the vertical scan circuit 1014 via a row control line 1015 used to select a row, and also connected to the column processing unit 1026 via a column signal line 1019. Here, the row control line 1015 refers to an entire line from the vertical scan circuit 1014 to the pixels 1003.

The horizontal scan circuit 1012 has a function of a readout scan unit that reads a count value from the column processing unit 1026 to a corresponding one of horizontal signal lines (not illustrated) via a horizontal control line 1016 used to select a column.

Each of the horizontal scan circuit 1012 and the vertical scan circuit 1014 includes, for example, a decoder, and starts scanning in response to a control signal provided from the timing control circuit 1020. The vertical scan circuit 1014 selects a row in the pixel array 1010 and supplies a necessary pulse to the selected row. The horizontal scan circuit 1012 sequentially selects the column AD circuits 1025 in the column processing unit 1026 so as to provide a signal of the selected column AD circuit 1025 to a corresponding one of the horizontal signal lines (horizontal output lines). It should be noted that the horizontal signal lines are provided in number corresponding to, for example, n bits (where n is a natural number) which the column AD circuit 1025 can deal with. For example, in the case of 10 bits (n=10), ten horizontal signal lines are provided.

Furthermore, pixel signals outputted from the pixels 1003 in each column are provided to a corresponding column AD circuit 1025 in the column processing unit 1026 via a corresponding column signal line 1019. Each of the column AD circuits 1025 in the column processing unit 1026 receives analog signals of pixels 1003 in a corresponding column, and processes the received analog signals.

Here, the AD conversion performed by the column processing unit 1026 adopts a method by which analog signals provided in parallel from the columns for each row are AD-converted by the column AD circuits 1025 provided to respective columns, into digital signals in parallel for each row. In this method, a technique of single slope integration (or ramp signal comparison) AD conversion is used.

In the single slope integration AD conversion, a target analog signal is converted to a digital signal based on a time period from when the conversion starts to when the reference signal voltage Vref1 or Vref2 becomes equal to the target signal voltage. In principle, the single slope integration AD conversion is performed in the following manner. Supply of ramp reference signal voltage Vref1 and Vref2 to a comparator (voltage comparator) is started, and counting (number count) by a clock signal is also started at the same time. Then, an analog pixel signal provided via the column signal line 1019 is compared to each of the reference signal voltages Vref1 and Vref2. Until a pulse signal indicates that an analog pixel signal is equal to each of the reference signal voltages Vref1 and Vref2, the counter/data storage unit 1254 keeps counting the clock counts.

CITATION LIST

Patent Literature

[Patent Literature 1] Japanese Unexamined Patent Application Publication No. 2011-41091.

SUMMARY

Technical Problem

The conventional solid-state imaging device disclosed in Patent Literature 1 performs the following AD conversion. In the AD conversion, according to a signal level of a pixel signal examined by the AD conversion selection circuit 1253, a switch to be used for each column is selected between the switch 1255 and the switch 1256. Therefore, if the signal level of the pixel signal is high, the reference signal voltage Vref1 having a sharp ramp (in other words, a large quantization error) is used, and restriction of a frequency band of the voltage comparison unit 1252 using the capacitance 1257 is not performed (in other words, a speed is high) so as not to suppress noises. On the other hand, if the signal level of the pixel signal is low, the reference signal voltage Vref2 having a rather flat ramp (in other words, having a small quantization error), and restriction of a frequency band of the voltage comparison unit 1252 using the capacitance 1257 is performed (in other words, a speed is slow) so as to suppress noises.

As described above, the conventional solid-state imaging device increases a speed of AD conversion, and reduces noises by restricting a frequency band of the voltage comparison unit.

However, in the conventional solid-state imaging device disclosed in Patent Literature 1, correlated sampling is not considered in the AD conversion circuit. The correlated sampling is performed in the following manner. A "base signal" (a reset level of a pixel from which a pixel signal has not yet been readout) provided from a pixel is AD-converted in a down-counting mode. Then, "pixel signal+base signal" (a signal level of the pixel from which a pixel signal has been readout) provided from the pixel is AD-converted in an up-counting mode. Therefore, a differential signal between the two AD-converted values is obtained ("pixel signal+base signal"– "base signal") as a resulting AD-converted value of the pixel signal.

In other words, the conventional solid-state imaging device disclosed in Patent Literature 1 neither considers nor observes effects of such correlated sampling by so-called up-down counting to cancel (a) KTC noise caused by resetting the pixel unit, (b) various fixed pattern noises such as vertical lines caused by variations of AD conversion delay, and (c) random noise caused mainly by a 1/f noise of low frequency.

Furthermore, the conventional solid-state imaging device has a following problems. In the conventional solid-state imaging device, a frequency band of the voltage comparison unit is switched according to a signal level of a pixel signal. Therefore, in the first AD conversion on "base signal", a signal level of a pixel signal is not certain. As a result, it is impossible to use the same frequency band and the same reference signal ramp for the second AD conversion on "pixel signal+base signal" and the first AD conversion on "base signal". Therefore, even if the conventional solid-state imaging device adopts correlated sampling, it is difficult to cancel fixed pattern noise.

The conventional solid-state imaging device has another problem. Although it is possible to determine a signal level of a pixel signal in the first AD conversion if the AD conversion on "pixel signal+base signal" is first performed, KTC noise caused by resetting are different between the first AD conversion and the second AD conversion because "base signal" is not the same. Therefore, even if the conventional solid-state imaging device adopts correlated sampling, it is still difficult to cancel fixed pattern noise.

As described above, the conventional solid-state imaging device fails to satisfy both (a) canceling of fixed pattern noise caused by correlated sampling using up-down counting and (b) suppression of noise by restricting a frequency band of the voltage comparison unit. In short, the conventional solid-state imaging device has a problem of deteriorating image quality due to noises.

In order to address the above problems, one non-limiting and exemplary embodiment provides a solid-state imaging device capable of suppressing image quality deterioration caused by noise.

Solution to Problem

In accordance with an aspect of the present invention for achieving the object, there is provided a solid-state imaging device including: a plurality of pixels arranged in rows and columns, each of the pixels converting received light into a signal voltage; and a column Analog-to-Digital (AD) conversion unit configured to convert the signal voltage to a digital signal, wherein the column AD conversion unit includes: a comparison unit configured to determine, as a comparison result, which is greater between a value of the signal voltage and a gradually changing value of a reference signal voltage; an up-down counting unit configured to (i) count, by one of down-counting and up-counting, a time period until the comparison result of the comparison unit is reversed if the signal voltage is a voltage of a base signal component of each of the pixels at a reset level, and (ii) count, by an other of the down-counting and the up-counting, a time period until the comparison result of the comparison unit is reversed if the signal voltage is a voltage of a superimposed signal component in which the base signal component is superimposed on a pixel signal component corresponding to an amount of light received by the each of the pixels, and the comparison unit has plural kinds of frequency band characteristics which are switchable.

With the above structure, it is possible to homogenize conversion gains, by using the same reference signal voltage for respective columns. Therefore, the conversion gains are not different from white balance gains assumed to be homogeneous (same) conversion gains. As a result, it is possible to reduce occurrence of color noise caused by coloring. In addition, by switching frequency band characteristics of the comparison unit, it is possible to suppress random noise.

Accordingly, the solid-state imaging device according to an aspect of the present disclosure is capable of suppressing image quality deterioration caused by noise.

Advantageous Effects

The solid-state imaging device according to the present disclosure is capable of suppressing image quality deterioration caused by noise.

BRIEF DESCRIPTION OF DRAWINGS

These and other advantages and characteristics will become apparent from the following description thereof taken in conjunction with the accompanying Drawings, by way of non-limiting examples of embodiments disclosed herein.

DESCRIPTION OF EMBODIMENT(S)

The following describes embodiments and their variations in detail with reference to the Drawings.

It should be noted that all the embodiments and variations described below are generic and specific examples of the present disclosure. Numerical values, shapes, materials, constituent elements, arrangement positions and the connection configuration of the constituent elements, steps, the order of the steps, and the like described in the following embodiments are merely examples. They are therefore not intended to limit the present disclosure. Therefore, among the constituent elements in the following embodiments and variations, constituent elements that are not described in independent claims that show the most generic concept of the present disclosure are described as elements constituting more desirable configurations.

Embodiment 1

A solid-state imaging device according to the present embodiment selects, in a down-counting period, a narrow band for frequency characteristics of a comparison unit, and selects the same narrow frequency band in an up-counting period. Therefore, the solid-state imaging device according to the present embodiment can suppress fixed pattern noise by performing correlated sampling. In addition, the solid-state imaging device according to the present embodiment can suppress random noise by restricting a frequency band of the comparison unit. Moreover, the solid-state imaging device according to the present embodiment can increase a speed of AD conversion by selecting a broad band for frequency characteristics of the comparison unit in a time period before starting the down-counting period and in a time period before starting the up-counting period.

The following describes a structure and processing of the solid-state imaging device according to Embodiment 1 with reference to the Drawings.

Figure 1:
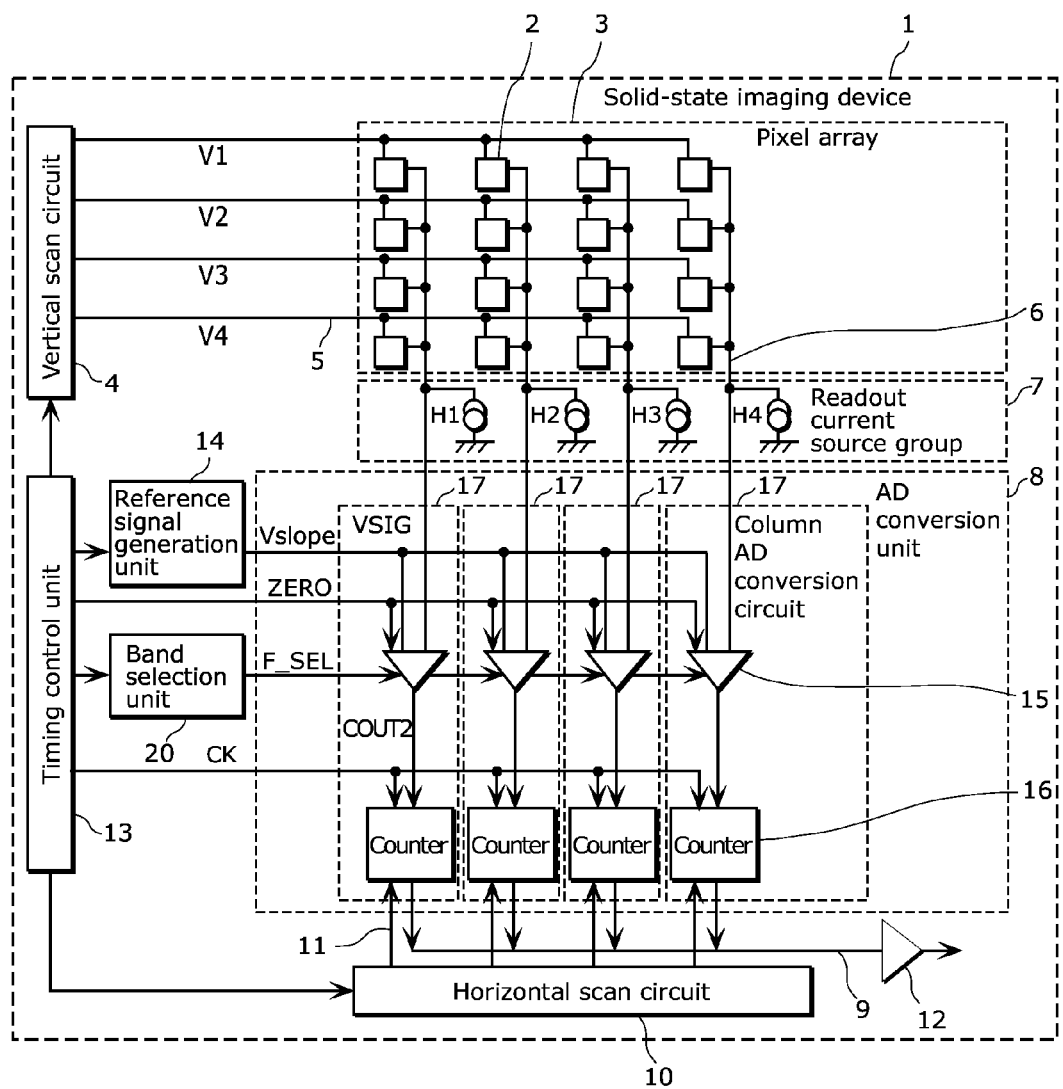
FIG. 1 is a block diagram illustrating an overall structure of a solid-state imaging device according to Embodiment 1.

FIG. 1 is a block diagram illustrating an overall structure of the solid-state imaging device 1 according to Embodiment 1. The solid-state imaging device according to the present embodiment includes a pixel array 3, a vertical scan circuit 4, row control lines 5, column signal lines 6, a readout current source group 7, an AD conversion unit 8, a horizontal signal line 9, a horizontal scan circuit 10, horizontal control lines 11, an output circuit 12, a timing control unit 13, a reference signal generation unit 14, and a band selection unit 20. Although the functional blocks illustrated in FIG. 1 are arranged to only one side of the pixel array 3, they may be arranged to both sides of the pixel array 3.

The pixel array 3 includes a plurality of pixels 2 arranged in rows and columns. Each of the pixels 2 performs photoelectric-conversion on incident light to generate a signal voltage. More specifically, the pixel 2 generates: a base signal component Vrst that is a signal voltage at a pixel 2 at a reset level; and a superimposed signal component Vrst+Vsig in which the base signal component Vrst is superimposed on a pixel signal component Vsig that is a signal voltage corresponding to an amount of light received by the pixel 2.

The vertical scan circuit 4 performs vertical scanning by sequentially selecting rows of the pixels 2 by sequentially activating the row control lines 5 according to signals provided from the timing control unit 13. Signal voltages at the selected row are transferred to the AD conversion unit 8 via the column signal lines 6 corresponding to the respective columns and the readout current source group 7.

Each of the column signal lines 6 is provided to a corresponding one of the columns of the pixels 2 to transfer signal voltages outputted from pixels 2 in the corresponding column.

The readout current source group 7 includes readout current sources each corresponding to a corresponding one of the columns in the pixel array 3. The readout current source group 7 provides the AD conversion unit 8 with signal voltages which are outputted to the column signal line 6.

The AD conversion unit 8 AD-converts the signal voltages provided from the pixel array 3 to digital signals. More specifically, the AD conversion unit 8 includes a plurality of column AD conversion circuits 17. Each of the column AD conversion circuits 17s is provided to a corresponding one of the column signal lines 6, and converts a signal voltage transferred via the corresponding column signal line 6 into a digital signal.

Each of the column AD conversion circuits 17 includes a voltage comparison unit 15 and an up-down counter/data storage unit 16. The voltage comparison unit 15 compares a value of a signal voltage to a gradually changing value of a reference signal voltage Vslope, thereby determining, as a comparison result, which is greater between the value of the signal voltage and the value of the reference signal voltage Vslope. The voltage comparison unit 15 has narrow-band frequency characteristics and broad-band frequency characteristics which are switchable. If the signal voltage compared to the reference signal voltage Vslope is a voltage of a base signal component Vrst in each pixel 2 at a reset level, the up-down counter/data storage unit 16 counts down a time period until the comparison result is reversed. On the other hand, if the signal voltage compared to the reference signal voltage Vslope is a voltage of a superimposed signal component Vrst+Vsig in which the base signal component Vrst is superimposed on a pixel signal component Vsig corresponding to an amount of light received by the pixel 2, the up-down counter/data storage unit 16 counts up a time period until the comparison result is reversed. It should be noted that each of the column AD conversion circuits 17 is an example of the column AD conversion unit according to the aspect of the present disclosure.

The horizontal signal line 9 transfers, to the output circuit 12, the digital signals provided from the AD conversion unit 8.

The horizontal scan circuit 10 performs horizontal scanning by sequentially selecting the columns of the column AD conversion circuits 17 by sequentially activating the horizontal control lines 11 according to signals provided from the timing control unit 13. A digital signal of a selected column is provided to the above-described horizontal signal line 9.

The output circuit 12 outputs a value of the digital signal transferred via the horizontal signal line 9, to the outside of the solid-state imaging device 1. The output circuit 12 is desirably, for example, a high-speed transfer circuit such as Low-Voltage Differential Signaling (LVDS). The output method, the circuit, and the structure of the output circuit 12 are not limited as long as the output circuit 12 can output digital signal values. Moreover, whether the values are outputted sequentially or in parallel, how many output ports are provided, and the like are not limited for the output circuit 12.

The timing control unit 13 is a circuit that controls times of processing performed by each of the processing units. More specifically, for example, the timing control unit 13 instructs the vertical scan circuit 4 when to activate a target row control line 5, and instructs the horizontal scan circuit 10 when to activate a target horizontal control line 11. Furthermore, the timing control unit 13 instructs the reference signal generation unit 14 when to generate the reference signal voltage Vslope, and instructs the band selection unit 20 when to generate a band selection signal F_SEL.

Under the control of the timing control unit 13, the reference signal generation unit 14 generates the reference signal voltage Vslope for AD conversion to be used by the AD conversion unit 8, and provides the same reference signal voltage Vslope to the column AD conversion circuits 17.

Under the control of the timing control unit 13, the band selection unit 20 selects frequency band characteristics of the voltage comparison unit 15 included in each of the column AD conversion circuits 17, and provides a band selection signal F_SEL to each of the column AD conversion circuits 17 to notify the selected frequency band characteristics. More specifically, as the frequency band characteristics for the voltage comparison unit 15, the band selection unit 20 selects narrow frequency band characteristics (hereinafter, referred to also as "narrow band characteristics") are selected in a counting period during which the up-down counter/data storage unit 16 counts a time period of comparison for a base signal component Vrst and in a counting period during which the up-down counter/data storage unit 16 counts a time period of comparison for a superimposed signal component Vrst+Vsig. On the other hand, the band selection unit 20 selects broad frequency band characteristics (hereinafter, referred to also as "broad band characteristics") in the other periods except the above counting periods.

As described above, the solid-state imaging device 1 according to the present embodiment includes: a plurality of pixels 2 arranged in rows and columns, each of the pixels converting received light into a signal voltage; and a column Analog-to-Digital (AD) conversion unit 17 that converts the signal voltage to a digital signal. The column AD conversion unit 17 includes: a voltage comparison unit 15 that determines, as a comparison result, which is greater between a value of the signal voltage and a gradually changing value of a reference signal voltage Vslope; an up-down counting unit 16 that (i) counts, by one of down-counting and up-counting, a time period until the comparison result of the voltage comparison unit 15 is reversed if the signal voltage is a voltage of a base signal component Vrst of each of the pixels 2 at a reset level, and (ii) counts, by an other of the down-counting and the up-counting, a time period until the comparison result of the voltage comparison unit 15 is reversed if the signal voltage is a voltage of a superimposed signal component Vrst+Vsig in which the base signal component Vrst is superimposed on a pixel signal component Vsig corresponding to an amount of light received by the each of the pixels 2. The voltage comparison unit 15 has plural kinds of frequency band characteristics which are switchable. It should be noted that the voltage comparison unit 15 corresponds to the comparison unit according to the aspect of the present disclosure, and that the up-down counter/data storage unit 16 corresponds to the up-down count unit according to the aspect of the present disclosure.

With the above structure, by sharing the same reference signal voltage Vslope among the columns, conversion gains are homogenized. As a result, the conversion gains are not different from white balance gains assumed to be homogeneous conversion gains. As a result, it is possible to reduce occurrence of color noise caused by coloring. In addition, by switching frequency band characteristics of the voltage comparison unit 15, it is possible to suppress random noise.

Thus, the solid-state imaging device 1 according to the present embodiment can suppress image quality deterioration caused by noise.

Next, the structure of the solid-state imaging device 1 according to the present embodiment is described in more detail.

Figure 2:
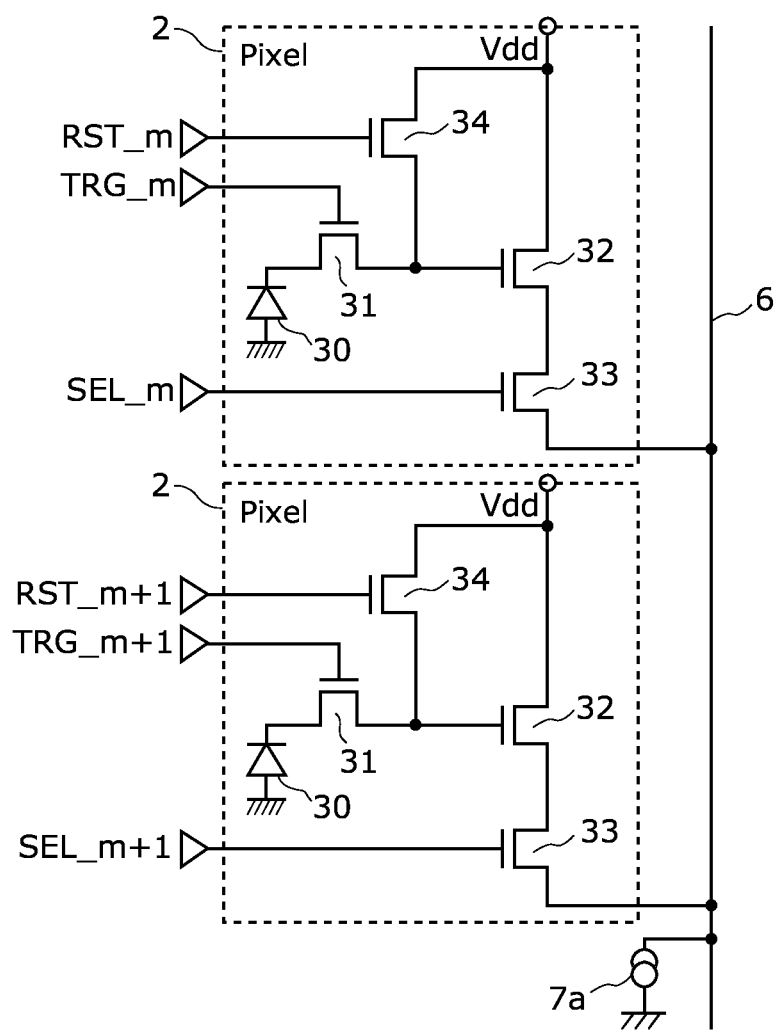
FIG. 2 is a circuit diagram illustrating of a detailed structure of a pixel.

FIG. 2 is a circuit diagram illustrating a detailed structure of the pixel 2 in the solid-state imaging device 1 illustrated in FIG. 1. Each of the pixels 2 is a so-called 4-transistor pixel, including a photodiode (pixel) 30, a transfer transistor 31, an amplification transistor 32, a selection transistor 33, and a reset transistor 34. FIG. 2 illustrates a pixel 2 in the m-th row and a pixel 2 in the (m+1)th row. FIG. 2 also illustrates a column signal line 6 and a readout current source 7a which are provided to a column including these pixels 2.

Serving as a row control line 5 for the m-th row, there are provided a reset signal line RST_m, a pixel selection signal line SEL_m, and a charge transfer signal line TRG_m to supply respective signals from the vertical scan circuit 4 to the pixel 2 in the m-th row. Output terminals of pixels 2 in the same column are connected to the same column signal line 6 provided to the column. A readout current source 7a, which is provided to each of the column signal lines 6, and an amplification transistor 32, which is in a row where a selection transistor 33 is conductive, form a source follower. In other words, the amplification transistor 32 is a transistor for providing a signal voltage to the column AD conversion circuit 17.

It should be noted that the illustrated structure of the pixel 2 is an example. The pixel 2 may be a so-called 3-transistor pixel without the selection transistor 33. The transistors included in the pixel 2 may be an NMOS transistor or a PMOS transistor. It is also possible that a plurality of column signal lines 6 are provided to a single column.

It should also be noted that the structure of the pixel 2 is not limited as long as the pixel 2 can provide the column signal line 6 with a signal voltage provided from the photodiode 30. For example, although the pixel 2 in FIG. 2 is so-called single-pixel single cell structure in which a single photodiode 30 is provided with a single transfer transistor 31 and a single amplification transistor 32. However, the pixel 2 may have a so-called multi-pixel single cell structure in which a plurality of photodiodes 30 share a single transfer transistor 31 and a single amplification transistor 32. It should also be noted that the structure of the readout current source 7a is not limited, and may use a resistance load means (a resistor element or on-resistance of a transistor).

In the pixel 2 in the m-th row, first, the reset signal line RST_m makes the reset transistor 34 conductive, thereby resetting a gate voltage of the amplification transistor 32, namely, a voltage of a so-called floating diffusion part. Subsequently, the pixel selection signal line SEL_m makes the selection transistor 33 conductive. Thereby, a voltage at the reset floating diffusion part is provided, as a voltage Vrst (base signal component) of a reset level of the pixel 2 in the m-th row, to the column signal line 6 via the amplification transistor 32, and thereby supplied to the AD conversion unit 8 at the later stage to be AD-converted.

Furthermore, the photodiode 30 accumulates charges that are generated by photoelectric conversion on light received during exposure. After a predetermined exposure period has passed, in the pixel 2 in the m-th row, the charge transfer signal line TRG_m makes the transfer transistor 31 conductive, thereby transferring the accumulated charges in the photodiode 30 to the floating diffusion part. The transferred charges are provided, as a voltage (Vrst+Vsig) (base signal component+pixel signal component) in which the voltage Vrst of the reset level of the pixel 2 in the m-th row is superimposed with a voltage Vsig of a signal level of the pixel 2 in the m-th row corresponding to the received light amount, to the column signal line 6 via the amplification transistor 32, and thereby supplied to the AD conversion unit 8 in the later stage to be AD-converted.

As a result, the AD conversion unit 8 extracts a difference between signals resulting from two AD conversion operations, in other words, performs correlated sampling, so as to obtain a signal level of the pixel 2 in the m-th row which corresponds to the received light amount. In other words, by performing correlated sampling to extract a difference between (a) a base signal component Vrst that is a signal voltage of a reset level of a pixel 2 and (b) a superimposed signal component Vrst+Vsig in which the base signal component Vrst is superimposed with a pixel signal component Vsig that is a signal voltage corresponding to an amount of light received by the pixel 2, it is possible to obtain the pixel signal component Vsig.

Furthermore, the correlated sampling can cancel (i) KTC noise included in a base signal component Vrst that is a voltage of a reset level and caused by resetting of the floating diffusion part, (b) various fixed pattern noises such as vertical lines caused by variations of AD conversion delay on respective columns, and (c) random noise caused mainly by 1/f noise of low frequency. It should be noted that, in the correlated sampling, in order to efficiently perform the noise cancellation, it is possible to perform a driving method using the same response speed and the same frequency band characteristics between different AD conversion operations for different pixel signal levels.

It should be noted that the driving method is not limited to the above. Any driving method is possible as long as the correlated sampling is efficiently performed by providing the AD conversion unit 8 with (a) a voltage Vrst of a reset level of the pixel 2 in the m-th row and (b) a voltage (Vrst+Vsig) in which the voltage Vrst is superimposed with a voltage Vsig of a signal level in the m-th row which corresponds to a received light amount.

Furthermore, in the present embodiment, it is also possible to provide a sample hold unit that sample-holds a signal to be provided to the AD conversion unit 8. In this case, it is possible to achieve so-called pipeline processing in which conversion of the AD conversion unit 8 and signal reading from the pixel 2 to the column signal line 6 are performed in parallel. As a result, the solid-state imaging device 1 can increase a frame rate.

It should also be noted that in the present embodiment, it is also possible to provide a signal amplification unit, such as Auto Gain Control (AGC), a so-called column amplifier, in the signal path from the output terminal of the pixel 2 to the input terminal of the AD conversion unit 8. This structure can increase a signal level of a signal inputted to the AD conversion unit 8. As a result, input conversion Signal-to-Noise (S/N) in the AD conversion is improved, and the solid-state imaging device 1 can enhance image quality. It should be noted that the column amplifier is desirably a so-called single-end inverter amplifier that drives constant-current loads in the source-grounded amplifier circuit. However, the column amplifier is not limited to the structure and may be other amplification means such as a differential amplifier circuit.

Next, the structure and the AD conversion of the AD conversion unit 8 are described.

As illustrated in FIG. 1, the AD conversion unit 8 is a single-slope AD conversion circuit. In the AD conversion unit 8, the column AD conversion circuits 17 provided to the respective columns convert a plurality of signal voltages provided from the column signal lines 6 provided to the respective columns into digital signals at the same time.

Each of the column AD conversion circuits 17 includes a voltage comparison unit 15 and an up-down counter/data storage unit 16. The voltage comparison unit 15 has a function of switching frequency band characteristics. The solid-state imaging device 1 includes a band selection unit 20 that selects the frequency band characteristics of the voltage comparison unit 15 according to a time of driving.

The reference signal generation unit 14 generates a reference signal voltage (ramp waveform signal voltage) Vslope that is gradually changing as a time passes. The reference signal voltage Vslope may have a smooth sloping waveform or a stepped waveform. The waveform of the reference signal voltage Vslope is not limited as long as the waveform is changed with a certain ramp (inclination). The ramp of the reference signal voltage Vslope may be positive or negative. The reference signal generation unit 14 may have a structure in which increasing or decreasing code values are given to a Digital-Analog Converter (DAC) and outputs of the DAC are filtered, or a structure in which an integral action is performed using a capacitance element. However, the structure of the reference signal generation unit 14 is not limited as long as the reference signal generation unit 14 can generate a waveform that is changed with a certain ramp. However, in order to homogenize conversion gains of the respective columns, the same reference signal voltage Vslope is provided to the column AD conversion circuits 17 in all of the columns.

The voltage comparison unit 15 compares (a) a value of a signal voltage that is provided to the column signal line 6 and converted to a digital signal, to (b) a gradually changing value of the reference signal voltage Vslope provided to the voltage comparison unit 15, so as to determine, as a comparison result, which is greater between the value of the signal voltage and the value of the reference signal voltage Vslope.

It should be noted that the structure of the voltage comparison unit 15 is not limited as long as the voltage comparison unit 15 can compare a signal voltage of the column signal line 6 to the reference signal voltage Vslope and switch frequency band characteristics. For example, the voltage comparison unit 15 may be not only a differential comparator having a well-known offset cancel function, but also a differential comparator including a so-called chopper comparator or the like.

The up-down counter/data storage unit 16 counts, in AD conversion, a time period from when the voltage comparison unit 15 starts the comparison until when the comparison result of the voltage comparison unit 15 is reversed. In other words, the up-down counter/data storage unit 16 counts a time period from when the voltage comparison unit 15 starts the comparison until when a value relationship between a signal voltage of the column signal line 6 and the reference signal voltage Vslope is changed (until when an output of the voltage comparison unit 15 is reversed). More specifically, the up-down counter/data storage unit 16 performs AD conversion by counting clocks CK that have been inputted from the start of the comparison to the change of value relationship between the signal voltage and the reference signal voltage Vslope. After the AD conversion, the up-down counter/data storage unit 16 holds a resulting digital signal value (count value). In this AD conversion, counting is performed twice. More specifically, an AD conversion operation is performed by counting down a time period of comparison for a voltage Vrst of a reset level, and another AD conversion operation is performed by counting up a time period of comparison for a voltage (Vrst+Vsig) in which the reset level voltage Vrst is superimposed with a signal level voltage Vsig corresponding to a received light amount. As a result, from difference information between the two AD conversion operations, a signal level of the pixel 2 can be determined.

In other words, the up-down counter/data storage unit 16 obtains a pixel signal component Vsig that is a signal voltage corresponding to an amount of light received by the pixel 2, by performing correlated sampling for extracting a difference between (a) a base signal component Vrst that is a signal voltage of a reset level of the pixel 2 and (b) a superimposed signal component Vsig+Vrst in which the base signal component Vrst is superimposed on the pixel signal component Vsig.

In order to efficiently operate the correlated sampling and reduce noise, the band selection unit 20 outputs a band selection signal F_SEL for selecting the same narrow frequency band characteristics both in the up-counting period and in the down-counting period. In order to increase a speed of the AD conversion, the band selection unit 20 outputs a band selection signal F_SEL for selecting broad-band frequency characteristics in a period before the down counting and in a period before the up counting.

In other words, under the control of the timing control unit 13, the band selection unit 20 selects the frequency band characteristics of the voltage comparison unit 15 in the column AD conversion circuit 17, so as to cause the voltage comparison unit 15 to switch the frequency band characteristics to the selected frequency band characteristics. More specifically, the band selection unit 20 selects narrow band characteristics both in a counting period in which the up-down counter/data storage unit 16 counts a time period of comparison for the base signal component Vrst and in a counting period in which the up-down counter/data storage unit 16 counts a time period of comparison for the superimposed signal component Vrst+Vsig. On the other hand, the band selection unit 20 selects broad band characteristics in the other periods except the counting periods.

Thereby, noise suppression using frequency band restriction can be limited only in the counting periods, and high-speed operations can be prioritized in the other operation periods. More specifically, if the voltage comparison unit 15 has narrow frequency band characteristics (if the frequency band is restricted), random noise can be suppressed. On the other hand, if the voltage comparison unit 15 has broad-band frequency characteristics, AD conversion can be performed at a high speed. Therefore, it is possible to achieve (a) suppression of fixed pattern noise by correlated sampling, (b) suppression of random noise by switching the frequency band characteristics of the voltage comparison unit 15, and (c) increase of a speed of the AD conversion.

It is also possible that the band selection unit 20 selects narrow band characteristics in a part of the counting period for comparison for the base signal component Vrst or a part of the counting period for comparison for the superimposed signal component Vrst+Vsig, and selects broad band characteristics in a part of the period before starting counting for comparison for the base signal component Vrst or a part of the period before starting counting for comparison for the superimposed signal component Vrst+Vsig.

Figure 3A:
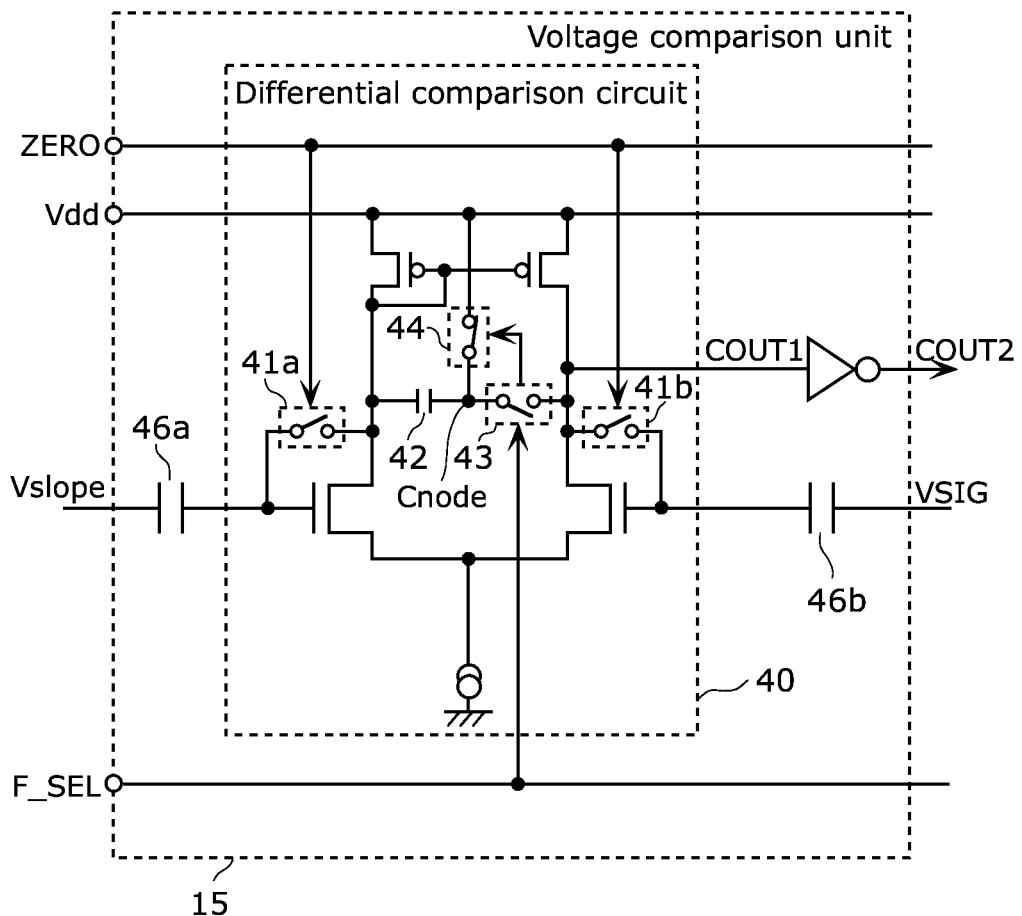
FIG. 3A is a circuit diagram illustrating an example of a detailed structure of a voltage comparison unit.
Figure 3B:
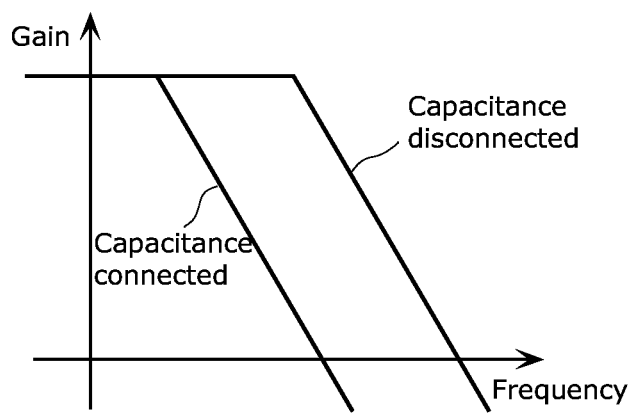
FIG. 3B is a graph plotting frequency band characteristics of the voltage comparison unit.

Next, the voltage comparison unit 15 is described in more detail with reference to FIGS. 3A and 3B. FIG. 3A is a circuit diagram illustrating an example of a detailed structure of the voltage comparison unit 15. FIG. 3B is a graph plotting the frequency band characteristics of the voltage comparison unit 15.

First, as illustrated in FIG. 3A, the voltage comparison unit 15 includes a differential comparison circuit 40 and offset cancel capacitances 46a and 46b. The differential comparison circuit 40 includes offset cancel switches 41a and 41b, a capacitance 42, a switch 43, and a pre-charge unit 44. Although the pre-charge unit 44 may not be provided, the provision of the pre-charge unit can further increase a speed of the AD conversion as described later.

In the voltage comparison unit 15, according to a control signal ZERO of an auto zero operation, the offset cancel switches 41a and 41b become conductive. Therefore, an operation point of the differential comparison circuit 40 is set, and an offset voltage at the differential comparison circuit 40 is held in the offset cancel capacitances 46a and 46b. As a result, a comparison operation in which offset is canceled, namely, comparison operation including a so-called auto zero operation, is performed.

Furthermore, according to the band selection signal F_SEL provided from the band selection unit 20, the voltage comparison unit 15 can switch the frequency band characteristics.

More specifically, the voltage comparison unit 15 controls a conductive state of the switch 43 according to a band selection signal F_SEL provided from the band selection unit 20, and controls connection of the capacitance 42. The connection state of the capacitance 42 varies the frequency band characteristics. In short, by switching the switch 43 between a conductive state and a non-conductive state, the connection state of the capacitance 42 is switched. As a result, the frequency band characteristics of the voltage comparison unit 15 are switched.

For example, if, as illustrated in FIG. 3B, the capacitance 42 is connected to between differential output terminals of the differential comparison circuit 40, the frequency band characteristics become a narrow band. On the other hand, if the capacitance 42 is disconnected between the differential output terminals of the differential comparison circuit 40, the frequency band characteristics become a broad band. In other words, if the band selection unit 20 causes the switch 43 to be conductive, the frequency band characteristics of the voltage comparison unit 15 become a narrow band. On the other hand, if the band selection unit 20 causes the switch 43 to be non-conductive, the frequency band characteristics of the voltage comparison unit 15 become a broad band As described above, the voltage comparison unit 15 includes: (a) the differential comparison circuit 40 that compares a signal voltage to a reference signal voltage; (b) the capacitance 42 having an end connected to one of differential output terminals of the differential comparison circuit 40; and (c) the switch 43 that controls conductive/non-conductive states between the other one of the differential output terminals of the differential comparison circuit 40 and the other end of the capacitance 42. By switching between a conductive state and a non-conductive state of the switch 43, the frequency band characteristics are switched.

Thereby, for example, by comparing the case where the capacitance is inserted between an output port of the voltage comparison unit 15 and a ground or power source, it is possible to achieve narrower frequency band characteristics with the same capacitance value.

Here, if the frequency band characteristics of the voltage comparison unit 15 are set to a narrow band, the solid-state imaging device 1 according to the present embodiment can relatively suppress noise for input signals provided from pixels. In other words, in comparison to the case where the frequency band characteristics of the voltage comparison unit 15 are set to a broad band, more noise can be suppressed.

Therefore, when the band selection unit 20 selects narrow band characteristics both in a counting period in which the up-down counter/data storage unit 16 counts a time period of comparison for a base signal component Vrst and in a counting period in which the up-down counter/data storage unit 16 counts a time period of comparison for a superimposed signal component Vrst+Vsig, it is possible to suppress fixed pattern noise in the correlated sampling of the column AD conversion circuit 17.

On the other hand, if the frequency band characteristics are set to a broad band, it is possible to relatively increase a speed of a response of the comparison operation, in other words, increase a speed of AD conversion. In other words, in comparison to the case where the frequency band characteristics of the voltage comparison unit 15 are set to a narrow band, it is possible to increase a speed of response of the comparison operation of the voltage comparison unit 15, thereby increasing a speed of the AD conversion of the column AD conversion circuit 17.

Therefore, if the band selection unit 20 selects broad band characteristics in periods except the counting periods of the up-down counter/data storage unit 16 for the comparison for the base signal component Vrst and the superimposed signal component Vrst+Vsig, it is possible to increase a speed of AD conversion of the column AD conversion circuit 17.

As described above, according to a band selection signal F_SEL provided from the band selection unit 20, the voltage comparison unit 15 selects narrow band characteristics both in a counting period in which the up-down counter/data storage unit 16 counts a time period of comparison for the base signal component Vrst and in a counting period in which the up-down counter/data storage unit 16 counts a time period of comparison for the superimposed signal component Vrst+Vsig, and selects broad band characteristics in the other periods except the counting periods.

As a result, it is possible to suppress fixed pattern noise by the correlated sampling using up-down counting, and also possible to increase a speed of the AD conversion.

Furthermore, the voltage comparison unit 15 includes the pre-charge unit 44 that pre-charges an end of the capacitance 42 when the switch 43 is disconnected. In other words, the voltage comparison unit 15 includes the pre-charge unit 44 that pre-charges the capacitance 42 when the switch 43 is disconnected to be non-conductive.

Thereby, when the frequency band characteristics of the voltage comparison unit 15 are changed from broad band characteristics to narrow band characteristics, in other word, when the capacitance 42 is changed from a disconnected state to a connected state, it is possible to prevent transient response delay caused by a potential difference of the capacitance 42 between before and after the connection. In other words, the pre-charge unit 44 can pre-charge a potential of the capacitance 42 to decrease the potential difference of the capacitance 42 between before and after connection. Furthermore, it is possible to pre-charge, to the capacitance 42, the same voltage as the output voltage of the differential comparison circuit 40 immediately prior to connection, in other words, the same voltage as the voltage supplied to the capacitance 42 by causing the switch 43 to be conductive.

In other words, in the present embodiment, in the case where the frequency band characteristics of the voltage comparison unit 15 are a broad band, it is possible to pre-charge a voltage at a node indicated as Cnode in FIG. 3A to be the same voltage as COUT1. More specifically, in a period during which the broad-band frequency characteristics are selected, the pre-charge unit 44 pre-charges a voltage at a terminal for controlling a conductive state and a disconnecting state of the capacitance 42 for determining a band of the differential comparison circuit 40, into the same voltage as that of the connecting target COUT1, by disconnecting the capacitance 42. As a result, the voltage at Cnode indicated in FIG. 3A is not changed between before and after switching of the frequency band characteristics according to the output signal F_SEL of the band selection unit 20. Thereby, it is possible to suppress mixing of noise caused by disconnection of the capacitance 42, suppress a response delay, and further increase a speed of the AD conversion.

It should be noted that the means for switching the frequency band characteristics which is described with reference to FIG. 3A is an example. The structure of the switching means is not limited as long as the frequency band characteristics are switchable according to a band selection signal F_SEL provided from the band selection unit 20. For example, the switching means may be connected between the output port of the differential comparison circuit 40 and the ground, and capable of controlling the connection.

In other words, it is possible that the voltage comparison unit 15 includes: the differential comparison circuit 40 that compares a signal voltage and a reference signal voltage Vslope; the capacitance connected to a connection point between the differential comparison circuit 40 and the up-down counter/data storage unit 16; and the switch that controls a conductive/non-conductive state between the output port of the differential comparison circuit 40 and the capacitance, and the voltage comparison unit 15 switches the switch between a conductive state and a non-conductive state, thereby switching the frequency band characteristics.

Thereby, for example, in comparison to the case where the frequency band characteristics are switched using a bias current and an output parasitic capacitance of the voltage comparison unit 15, the above case can switch the frequency band characteristics of the voltage comparison unit 15 with a higher accuracy and more easily.

As described above, the solid-state imaging device 1 according to the present embodiment is characterized in the following features. In sweeping a reference signal (hereinafter, referred to as a "reference signal sweep") for comparison for a reset level (namely, a base signal) and a reference signal sweep for comparison for a voltage in which the reset level is superimposed on a signal level (namely, base signal+pixel signal), the frequency band characteristics of the differential comparison circuit 40 are set to be a narrow band (frequency band characteristics except the broadest frequency band characteristics among plural kinds of switchable frequency band characteristics of the voltage comparison unit 15) according to a band selection signal F_SEL provided from the band selection unit 20. On the other hand, prior to start of the reference signal sweep, in other words, in a period before start of counting by the up-down counter/data storage unit 16, the frequency band characteristics of the differential comparison circuit 40 are set to be a broad band.

Figure 4:
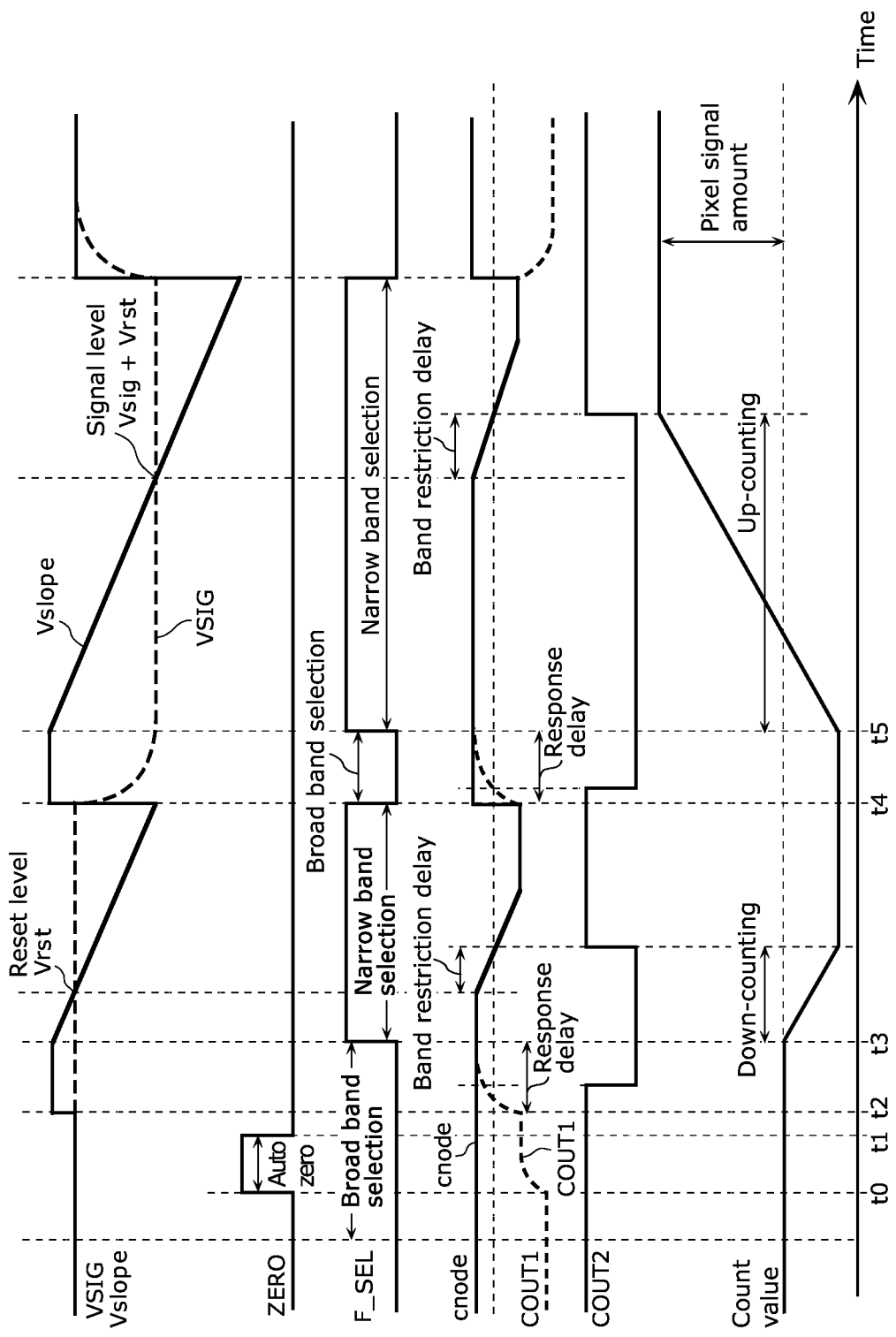
FIG. 4 is a time chart of processing performed by the solid-state imaging device.

Next, the present disclosure is described in more detail by referring to operation times of the solid-state imaging device 1 according to the present embodiment. FIG. 4 is a time chart of processing performed by the solid-state imaging device 1.

FIG. 4 illustrates times of: a signal voltage VSIG provided to the voltage comparison unit 15 via the column signal line 6; a reference signal Vslope generated by the reference signal generation unit 14; a control signal ZERO for controlling an auto zero operation of the voltage comparison unit 15; a signal F_SEL indicating a band selected by the band selection unit 20; a voltage cnode (voltage at a node Cnode) at one end of the capacitance 42; a voltage COUT1 at an output terminal of the differential comparison circuit 40; a voltage COUT2 at an output terminal of the voltage comparison unit 15; and a count value of the up-down counter/data storage unit 16. It is assumed that F_SEL is HIGH when the band selection unit 20 selects narrow band characteristics as the frequency band characteristics of the voltage comparison unit 15, and F_SEL is LOW when the band selection unit 20 selects broad band characteristics as the frequency band characteristics of the voltage comparison unit 15.

First, in a period from time t0 to time t1, an operation point of the differential comparison circuit 40 is set according to the control signal ZERO of the auto zero operation. During this period for setting the operation point (hereinafter, referred to as an "operation point setting period"), the pixel 2 provides a reset level Vrst to the differential comparison circuit 40 via the column signal line 6. However, in this period, the AD conversion is not performed, and it is not necessary to suppress noise. Therefore, it is not necessary to set the frequency band characteristics of the differential comparison circuit 40 to be a narrow band. On the contrary, setting of the frequency band characteristics of the differential comparison circuit 40 to a narrow band extends a time period required to cause the output voltage COUT1 of the differential comparison circuit 40 to converge to a voltage at the operation point, namely, the operation point setting period.

Therefore, in the solid-state imaging device 1 according to the present embodiment, in a period prior to start of a reference signal sweep including the operation point setting period of the differential comparison circuit 40, the frequency band characteristics of the differential comparison circuit 40 are set to a broad band according to the output signal F_SEL of the band selection unit 20.

In other words, the band selection unit 20 selects broad band characteristics in a period prior to start of counting for comparison for the base signal component Vrst.

As a result, it is possible to reduce an entire period required for AD conversion including the operation point setting period of the differential comparison circuit 40, thereby increasing a speed of the AD conversion.

It should be noted that, in FIG. 4, in order to surely fix an output of the differential comparison circuit 40 to have an initial polarity, in a period from time t2 to time t3, the reference signal voltage Vslope is added with an initial voltage. Here, a period in which the output voltage COUT1 of the differential comparison circuit 40 responses to the added initial voltage is influenced by the frequency band characteristics of the differential comparison circuit 40. Therefore, in the present embodiment, also in a period (from time t2 to time t3) in which an offset is added to the reference signal voltage Vslope, the frequency band characteristics of the differential comparison circuit 40 are set to a broad band. As a result, it is possible to further reduce an entire time period required for AD conversion, thereby increasing a speed of the AD conversion. In other words, in the period for initializing the reference signal from time t2 to time t3, the band selection unit 20 selects broad band characteristics.

Next, at time t3, a reference signal sweep for comparison for a reset level (namely, base signal component Vrst) is started, and the same time, counting of the up-down counter/data storage unit 16 (in the example of FIG. 4, down-counting) is also started, thereby performing single-slope AD conversion. Here, the band selection unit 20 sets the output signal F_SEL to HIGH so as to set the frequency band characteristics of the differential comparison circuit 40 to a narrow band. In other words, in a counting period (from time t3 to time t4) for comparison for the base signal component Vrst, the band selection unit 20 selects narrow band characteristics and causes the voltage comparison unit 15 to switch the frequency band characteristics to narrow band characteristics.

It is therefore possible to produce effects of band restriction of the differential comparison circuit 40. By suppressing random noise components, AD conversion can be performed with low noise.

After the AD conversion for the reset level, another AD conversion is performed for a voltage Vsig+Vrst in which the reset level is superimposed on a signal level. Therefore, it is necessary to set the reference signal Vslope back to the initial voltage. In addition, the output voltage COUT1 of the differential comparison circuit 40 also converges to an initial voltage.

Therefore, in a period from time t4 to time t5, the reference signal voltage Vslope is added with the initial voltage. As described above, a period in which the output voltage COUT1 of the differential comparison circuit 40 responses to the added initial voltage is influenced by the frequency band characteristics of the differential comparison circuit 40. Therefore, in the present embodiment, after the AD conversion for the reset level, the frequency band characteristics of the differential comparison circuit 40 are set to a broad band according to the output signal F_SEL of the band selection unit 20. As a result, it is possible to increase a speed of convergence of the output voltage COUT1 of the differential comparison circuit 40, and eventually increase a speed of the AD conversion. In other words, in the reference signal initialization period from time t4 to time t5, the band selection unit 20 selects broad band characteristics to cause the voltage comparison unit 15 to switch the frequency band characteristics to broad band characteristics.

Furthermore, at time t4, when the reference signal Vslope is set back to the initial voltage, a voltage Vsig+Vrst in which the reset level is superimposed on the signal level (namely, pixel signal component Vsig) is supplied from the pixel 2 to the differential comparison circuit 40 via the column signal line 6.

After that, at time t5, a sweep of the reference signal Vslope is started, and at the same time, counting of the up-down counter/data storage unit 16 (in the example of FIG. 4, up-counting) is also started, thereby performing single-slope AD conversion. Here, setting a direction of the counting of the up-down counter/data storage unit 16 to be different from the direction used in the AD conversion for the reset level corresponds to subtracting the reset level Vrst from the voltage Vsig+Vrst in which the reset level is superimposed on the signal level. As a result, a result of the AD conversion for the signal level Vsig can be obtained. The above processing is generally called correlated sampling. The correlated sampling can suppress (a) KTC noise caused by resetting the pixel unit, (b) various fixed pattern noises such as vertical lines caused by variations of AD conversion delay, and (c) random noise caused mainly by a 1/f noise of low frequency.

Therefore, in the present embodiment, the frequency band characteristics of the differential comparison circuit 40 are set to the same narrow band characteristics in both up-counting and down-counting of the up-down counter/data storage unit 16. As a result, it is possible to maximize effects of the correlated sampling.

In other words, the band selection unit 20 selects, in the counting period for comparison for the base signal component Vrst, narrow frequency band characteristics from among plural kinds of frequency band characteristics, while the band selection unit 20 selects, in the counting period for comparison for the superimposed signal component Vrst+Vsig, the substantially same narrow frequency band characteristics as selected in the counting period for the comparison for the base signal component Vrst.

Therefore, it is possible to achieve both suppression of fixed pattern noise by the correlated sampling and suppression of random noise by switching the frequency band characteristics of the voltage comparison unit 15. As a result, image quality deterioration caused by noise can be decreased.

It is also possible that the band selection unit 20 selects, in a part of the counting period for comparison for the base signal component Vrst, narrow frequency band characteristics, and selects, in a part of the counting period for comparison for the superimpose signal component Vrst+Vsig, the substantially same narrow frequency band characteristics as selected in the part of the counting period for the comparison for the base signal component Vrst.

It should be noted that, in the present embodiment, if increase of fixed pattern noise and random noise which are caused by insufficient effects of the correlated sampling resulting from a different between the frequency band characteristics in up-counting and the frequency band characteristics in down-counting is within an acceptable range for the solid-state imaging device 1, the two frequency band characteristics are considered as the substantially same narrow band characteristics.

It should be noted that, in the present disclosure, the down-counting and the up-counting in FIG. 4 may be reversed. More specifically, the following is also possible. First, a reference signal sweep for comparison for a reset level Vrst (namely, base signal) is started. At the same time, up-counting of the up-down counter/data storage unit 16 is performed. Then, when the reference signal Vslope is set back to an initial voltage, a voltage Vsig+Vrst in which the reset level is superimposed on a signal level is supplied from a pixel to the differential comparison circuit 40 via the column signal line 6. After that, sweeping of the reference signal Vslope is started, and at the same time, down-counting of the up-down counter/data storage unit 16 is performed.

As described above with reference to the drawings, the solid-state imaging device according to the present embodiment selects the same narrow frequency band characteristics in both the two AD conversion operations. Thereby, the correlated sampling is efficiently operated, and noise suppression effects of the differential comparison circuit are maximized. As a result, it is possible to suppress random noise and fixed pattern noise at maximum.

In other words, the solid-state imaging device 1 according to the present embodiment includes: a plurality of pixels 2 arranged in rows and columns, each of the pixels converting received light into a signal voltage; and a column Analog-to-Digital (AD) conversion unit 17 that converts the signal voltage to a digital signal. The column AD conversion unit 17 includes: a voltage comparison unit 15 that determines, as a comparison result, which is greater between a value of the signal voltage and a gradually changing value of a reference signal voltage Vslope; an up-down counting unit 16 that (i) counts, by one of down-counting and up-counting, a time period until the comparison result of the voltage comparison unit 15 is reversed if the signal voltage is a voltage of a base signal component Vrst of each of the pixels 2 at a reset level, and (ii) counts, by an other of the down-counting and the up-counting, a time period until the comparison result of the voltage comparison unit 15 is reversed if the signal voltage is a voltage of a superimposed signal component Vrst+Vsig in which the base signal component Vrst is superimposed on a pixel signal component Vsig corresponding to an amount of light received by the each of the pixels 2. The voltage comparison unit 15 has plural kinds of frequency band characteristics which are switchable.

As a result, fixed pattern noise can be suppressed by correlated sampling using up/down counting. Furthermore, by selecting broad-band frequency characteristics in periods except the counting period for comparison for the base signal component Vrst and the counting period for comparison for the superimposed signal component Vsig+Vrst, it is possible to reduce a time required for periods except the counting periods.

Furthermore, the same frequency band characteristics are selected both in the up-counting period and in the down-counting period. Thereby, the same conversion delay occurs in the both AD conversion operations. As a result, it is possible to maximize noise cancellation effects of the correlated sampling, thereby obtaining images of high quality with less vertical line noise and the like.

Moreover, broad-band frequency characteristics are selected in a period before starting the reference signal sweep.

As a result, it is possible to increase a speed of a part of periods which does not contribute to noise characteristics of the AD conversion results, thereby increasing a speed of the entire AD conversion. In particular, if broad-band frequency characteristics are selected in a part of periods where a voltage value of the reference signal Vslope is dramatically changed, it is possible to significantly increase a speed of the differential comparison circuit. As a result, it is possible to increase a speed by reducing a time required for AD conversion, increase a frame rate of the solid-state imaging device 1, and increase the number of pictures continuously captured.

Furthermore, in the conventional solid-state imaging devices, a conversion time period is not different between when a frequency band of the voltage comparison unit is restricted and when the frequency band is not restricted, so that plural kinds of reference signal voltages having different ramps (inclinations) are necessary. If a single reference signal voltage is used, a time period for AD conversion on a column for which a narrow frequency band is selected is dominant. Therefore, it is not necessary to select a broad frequency band according to a pixel signal level.

On the other hand, if a plurality of reference signal voltages having different ramps (a ramp of one reference signal voltage=a ramp of the other reference signal voltage×2) are used, there is a gain difference that is twice as large as a design value caused by a difference between ramps of the reference signal voltages. Therefore, in order to homogenize AD conversion gains in an image, it is necessary to convert the conversion gain difference by, for example, adjusting a frequency of a counting clock or performing digital calculation after the AD conversion.

However, when a plurality of reference signal voltages are used, a plurality of AD conversion gains, namely, ramps (inclinations) of the respective reference signal voltages are not completely identical to a design value, even if the reference signal voltages are generated by respective reference signal generation units having the completely same circuit structure. Even if a difference between ramps of the reference signal voltages is ideally double, in practice, the reference signal voltages have a ramp difference of 2.1 times, for example. In this case, in a conversion operation on a conversion gain difference assumed to have a double ramp difference, it is not possible to completely convert the gain difference. The AD conversion gains are different depending on used reference signal voltages. Therefore, the AD conversion gains are different from white balance gains assumed to be the same conversion gains. As a result, color noise occurs due to coloring, which seriously deteriorates image quality. The image quality deterioration caused by the gain difference causes noise components with a fixed pattern depending on values of signals. Therefore, this image quality deterioration is a very serious problem unlike circuit (random) noise.

In contrast, the solid-state imaging device 1 according to the present embodiment uses a single reference signal voltage Vslope for signal voltages of each column. As a result, it is possible to prevent the problem of a gain difference between columns. By eliminating such a gain difference between the columns, the AD conversion gains are not different from white balance gains assumed to be the same between the columns and between the pixels. As a result, it is possible to generate high-quality images with little image quality deterioration such as coloring or color noise.

More specifically, the solid-state imaging device 1 according to the present embodiment is capable, with high satisfaction, of both (a) increase of a speed of the AD conversion and (b) reduction of both random noise and fixed pattern noise.

Embodiment 2

The following describes a structure and processing of a solid-state imaging device according to Embodiment 2 with reference to the Drawings, mainly explaining differences from Embodiment 1.

The solid-state imaging device according to Embodiment 2 has the almost same structure as that of the solid-state imaging device 1 according to Embodiment 1, but differs from the solid-state imaging device 1 in including a mode distinguishing circuit for selecting frequency band characteristics of the voltage comparison unit 15 according to a mode. The mode distinguishing circuit receives a mode control signal and selects frequency band characteristics of the voltage comparison unit 15 via the band selection unit 20 according to a mode instructed by the received mode control signal.

Figure 5:
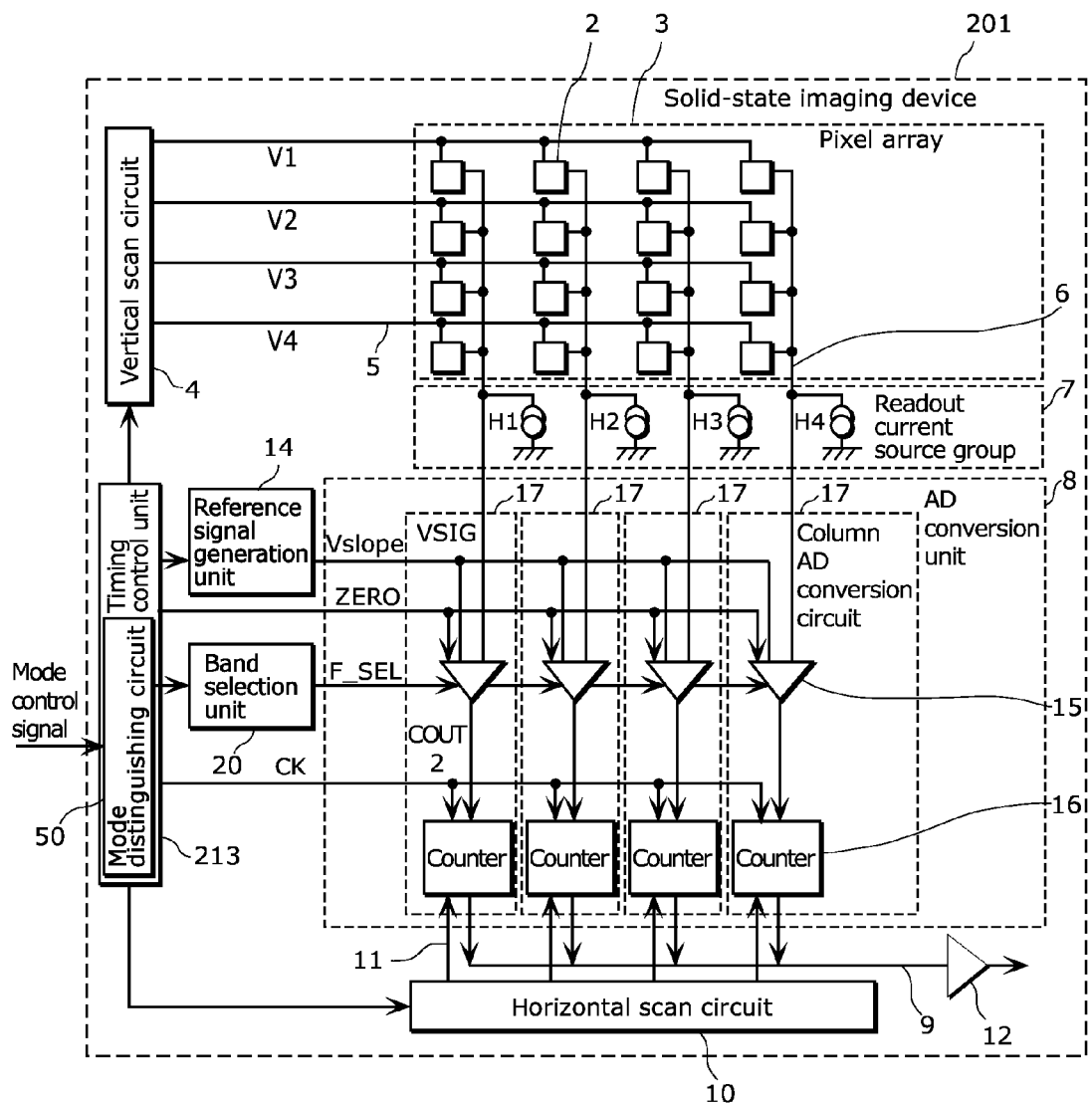
FIG. 5 is a block diagram illustrating an overall structure of a solid-state imaging device according to Embodiment 2.

FIG. 5 is a block diagram illustrating an overall structure of the solid-state imaging device according to Embodiment 2. It should be noted that the same reference numerals in FIG. 1 are assigned to identical structural elements in FIG. 5.

As illustrated in FIG. 5, a solid-state imaging device 201 according to Embodiment 2 has almost the same structure as that of the solid-state imaging device 1 according to Embodiment 1. The solid-state imaging device 201 differs from the solid-state imaging device 1 in including a mode distinguishing circuit 50. The mode distinguishing circuit 50 determines, for each input mode control signal, whether or not a mode instructed by the mode control signal includes a pixel signal addition operation. If the mode includes a pixel signal addition operation, the mode distinguishing circuit 50 selects broad-band frequency characteristics as frequency band characteristics of the voltage comparison unit 15 via the band selection unit 20. On the other hand, if the mode does not include a pixel signal addition operation, the mode distinguishing circuit 50 selects narrow-band frequency characteristics as frequency band characteristics of the voltage comparison unit 15 via the band selection unit 20.

It should be noted that, in the present embodiment, the broad-band frequency characteristics correspond to the third frequency band characteristics according to the aspect of the present disclosure, and the narrow-band frequency characteristics correspond to the fourth frequency band characteristics according to the aspect of the present disclosure.

The input mode control signal indicates, for example, details of the mode, such as a High-Definition (HD) video mode or a still picture mode. In some modes, a pixel signal addition operation is performed to add signals of two pixels together horizontally and vertically to eventually add signals of four pixels together to be outputted, not to output pixel signals in the number of pixels.

In general, in the pixel signal addition operation, for example, if signals of four pixels are to be added together, a resulting signal amount is four times. However, since random noise components remain only in the increase of a square root, a resulting noise amount is double. Therefore, an SN ratio is increased double in comparison to the case without the pixel signal addition operation.

Therefore, in a mode not including a pixel signal addition operation, the solid-state imaging device 201 according to the present embodiment maximizes noise reduction by setting the frequency band characteristics of the voltage comparison unit 15 to a narrow band. On the other hand, in a mode including a pixel signal addition operation, the pixel signal addition operation can reduce noise, so that the solid-state imaging device 201 sets the frequency band characteristics of the voltage comparison unit 15 to a relatively broad band to increase a speed of AD conversion. As a result, the solid-state imaging device 201 can achieve both the noise reduction and the operation speed increase.

More specifically, in the same manner as described for the solid-state imaging device 1 according to Embodiment 1, the solid-state imaging device 201 according to Embodiment 2 selects the same narrow-band frequency characteristics both in AD conversion on base signal component and AD conversion on superimposed signal component. Thereby, the solid-state imaging device 201 effectively performs correlated sampling, and maximizes effects of noise suppression of the differential comparison circuit to suppress random noise and fixed pattern noise at maximum. Furthermore, in the present embodiment, in a mode including pixel signal addition operation, the frequency band characteristics of the voltage comparison unit 15 are set to a relatively broad band, thereby increasing a speed of AD conversion. As a result, the solid-state imaging device 201 according to the present embodiment can achieve both the noise reduction and the operation speed increase.

As described above, the solid-state imaging device 201 according to Embodiment 2 differs from the solid-state imaging device 1 according to Embodiment 1 in further including the mode distinguishing circuit 50 that distinguishes a plurality of modes including at least one mode including a pixel signal addition operation that is an operation for adding together a plurality of signal voltages converted for different pixels 2. According to results of the distinguishing of the mode distinguishing circuit 50, the band selection unit 20 selects broad-band frequency characteristics in at least one mode including the pixel signal addition operation, and selects narrow-band frequency characteristics in the other mode not including the pixel signal addition operation.

As a result, in an operation mode in which a pixel signal addition operation suppresses random noise, high-speed operation has a priority over noise reduction by frequency band restriction. In an operation mode not including a pixel signal addition operation and therefore not suppressing random noise, noise reduction by frequency band restriction has a priority over the high-speed operation.

(Variation 1 of Embodiment 2)

A solid-state imaging device according to a variation of Embodiment 2 has almost the same structure as that of the solid-state imaging device 201 according to Embodiment 2. The solid-state imaging device according to the present variation differs from the solid-state imaging device 201 in operation modes. The following describes the present variation, mainly explaining the differences from the solid-state imaging device 201 according to Embodiment 2.

Figure 6:
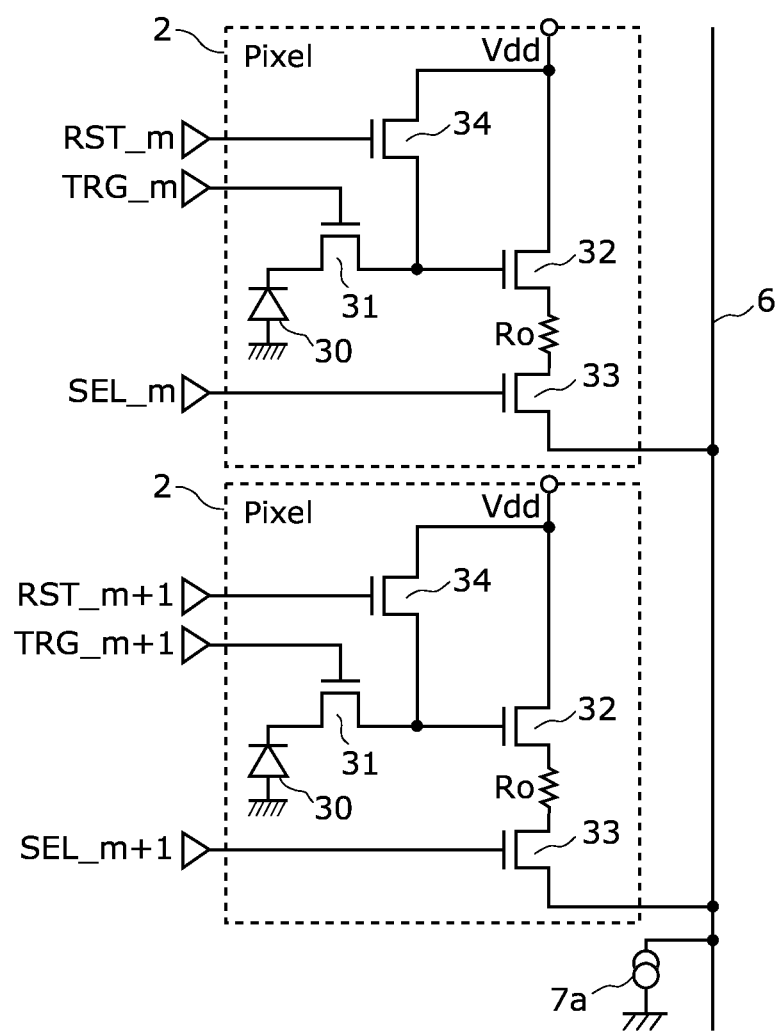
FIG. 6 is a circuit diagram illustrating output impedance of a pixel according to Variation 1 of Embodiment 2.

FIG. 6 is a diagram illustrating an output impedance Ro of an amplification transistor 32 in a pixel 2, for the sake of easy understanding of the present variation.

The solid-state imaging device according to the present variation includes a mode distinguishing circuit 50 to select the frequency band characteristics according to a mode. The mode distinguishing circuit 50 receives a mode control signal indicating one of a plurality of modes including a pixel signal averaging operation, and selects the frequency band characteristics of the voltage comparison unit 15 via the band selection unit 20 according to the mode control signal.

In the pixel signal averaging operation, the solid-state imaging device according to the present variation causes, for example, an amplification transistor 32 and a selection transistor 33 in the m-th row and an amplification transistor 32 and a selection transistor 33 in the (m+1)th row to be conductive at the same time. As a result, base signals for the two rows, or a signal that is an average of the pixel signals are provided to the same corresponding column signal line 6. In other words, the pixel signal averaging operation is performed by causing the amplification transistors 32 in the plurality of pixels 2 to be conductive at the same time.

Here, if a single readout current source 7a is shared by a plurality of amplification transistors 32, in general, one of the amplification transistors determines an output voltage. However, each of the amplification transistors 32 used in an image sensor stores data for each pixel. Therefore, a size of the amplification transistor 32 is decreased, and the output impedance Ro is increased. Furthermore, a gate of the amplification transistor 32 is driven by floating. Therefore, a signal is fed-back from a source to a gate with a capacitance component between the gate and the source. Moreover, if a plurality of amplification transistors 32 are set to be conductive at the same time, the pixel signal averaging operation is performed by resistance dividing and capacitance dividing.

The pixel signal averaging operation causes a plurality of amplification transistors 32 to be conductive at the same time. Therefore, a total number of output impedances is Ro/the number of conductive amplification transistors 32. As a result, it is possible to decrease the output impedances, and reduce a time period required for convergence of a base signal and pixel signal which are outputted via the amplification transistor 32 is reduced. It is thereby possible to keep more time available for AD conversion.

Furthermore, in the present variation, in a mode including the pixel signal averaging operation, by using such a time period available for AD conversion, noise is further suppressed. Therefore, in the mode including the pixel signal averaging operation, relatively narrow-band frequency characteristics are selected, in comparison to a mode including the pixel signal averaging operation.

Therefore, in the same manner as described for the solid-state imaging device 1 according to Embodiment 1, the solid-state imaging device according to Variation 1 of Embodiment 2 selects the same narrow-band frequency characteristics both in AD conversion on base signal component and AD conversion on superimposed signal component. Thereby, the solid-state imaging device effectively performs correlated sampling, and maximizes effects of noise suppression of the differential comparison circuit to suppress random noise and fixed pattern noise at maximum. Furthermore, in the present variation, in a mode including a pixel signal averaging operation, the frequency band characteristics of the voltage comparison unit 15 are set to a relatively narrow band, thereby further suppressing noise without sacrificing a time period for AD conversion. As a result, the solid-state imaging device according to the present variation can achieve both the noise reduction and the operation speed increase.

As described above, in the solid-state imaging device according to the present variation, the mode distinguishing circuit 50 distinguishes a plurality of modes including at least one mode including a pixel signal averaging operation of causing a plurality of amplification transistors 32 in a plurality of pixels 2 to be conductive at the same time. Then, according to the results of the distinguishing made by the mode distinguishing circuit 50, the band selection unit 20 selects frequency band characteristics. In at least one operation mode not including a pixel signal averaging operation, the band selection unit 20 selects broad-band frequency characteristics. In the other operation mode including the pixel signal averaging operation, the band selection unit 20 selects narrow-band frequency characteristics. It should be noted that the mode distinguishing circuit 50 corresponds to the operation mode distinguishing unit according to the aspect of the present disclosure.

Thereby, in an operation mode including a pixel signal averaging operation that is an operation for increasing a speed of reading a pixel signal component Vsig by decreasing output impedance by causing a plurality of amplification transistors 32 to be conductive, noise reduction by frequency band restriction has a priority. In contrast, in an operation mode not including the pixel signal averaging operation for increasing a speed of reading pixel signals, a high-speed operation has a priority. As a result, even in a plurality of operation modes including a pixel signal averaging operation, the solid-state imaging device according to the present variation can achieve (a) suppression of fixed pattern noise by correlated sampling, (b) suppression of random noise by switching the frequency band characteristics of the voltage comparison unit 15, and (c) increase of a speed of the AD conversion.

(Variation 2 of Embodiment 2)

A solid-state imaging device according to Variation 2 of Embodiment 2 has the almost same structure as that of the solid-state imaging device 201 according to Embodiment 2. The solid-state imaging device according to Variation 2 of Embodiment 2 differs from the solid-state imaging device 201 in that a different set of operation modes is used, that the mode distinguishing circuit 50 distinguishes a plurality of modes including at least one of a video capturing mode and a still picture capturing mode, and that the band selection unit 20 selects, according to a result of the distinguishing made by the mode distinguishing circuit 50, broad-band frequency characteristics in the video capturing mode and selects narrow-band frequency characteristics in the still picture capturing mode. The following describes Variation 2 of Embodiment 2, mainly explaining the differences from the solid-state imaging device 201 according to Embodiment 2.

In the video capturing mode, in most cases, a time period available for AD conversion is tightly restricted, for example, restricted to 60 frames per second or 30 frames per second. On the other hand, in the still-picture capturing mode, since capturing is performed for each picture, there is no tight restriction on frame rate, and therefore a relatively more time period is available for AD conversion.

Furthermore, in the video capturing mode, a plurality of pictures are sequentially displayed in a time axis direction. Therefore, human eyes are expected to serve as a visual filter suppressing random noise of video in the time axis direction, so that noise in video is rather relatively tolerated. On the other hand, in the still-picture capturing mode, since a human sees only one picture as long as he/she likes, there is a relatively severe requirement for preventing noise from a still picture.

Therefore, in the still-picture capturing mode, a time period available for AD conversion is used to deal with the relatively severe requirement for the noise. Therefore, in the still-picture capturing mode, relatively narrow-band frequency characteristics are selected as the frequency band characteristics of the voltage comparison unit 15 in comparison to the case of the video capturing mode. Moreover, in the video capturing mode, relatively broad-band frequency characteristics are selected as the frequency band characteristics of the voltage comparison unit 15 in comparison to the still-picture capturing mode. As a result, a speed of AD conversion is increased.

Therefore, in the same manner as described for the solid-state imaging device 1 according to Embodiment 1, the solid-state imaging device according to Variation 2 of Embodiment 2 selects the same narrow-band frequency characteristics both in AD conversion on base signal component and AD conversion on superimposed signal component. Thereby, the solid-state imaging device effectively performs correlated sampling, and maximizes effects of noise suppression of the differential comparison circuit to suppress random noise and fixed pattern noise at maximum. In addition, as the frequency band characteristics of the voltage comparison unit 15, relatively narrow-band frequency characteristics are selected in the still-picture capturing mode and relatively broad-band frequency characteristics are selected in the video capturing mode. As a result, it is possible to achieve both the noise reduction and the operation speed increase.

As described above, the solid-state imaging device according to Variation 2 of Embodiment 2 includes the mode distinguishing circuit that distinguishes a plurality of operation modes including at least one of the video capturing mode and the still-picture capturing mode. According to a result of the determination made by the mode distinguishing circuit, the band selection unit selects broad-band frequency characteristics in the video capturing mode and selects the narrow-band frequency characteristics in the still-picture capturing mode.

Therefore, a high-speed operation has a priority in the video capturing mode in which a frame rate is restricted and the high-speed operation is required, while noise reduction has a priority in the still-picture capturing mode in which a frame rate is not required. As a result, even the solid-state imaging device that operates in the video capturing mode and the still-picture capturing mode is capable of achieving (a) suppression of fixed pattern noise by correlated sampling, (b) suppression of random noise by switching the frequency band characteristics of the voltage comparison unit 15, and (3) increase of a speed of the AD conversion.

Embodiment 3

Figure 7A:
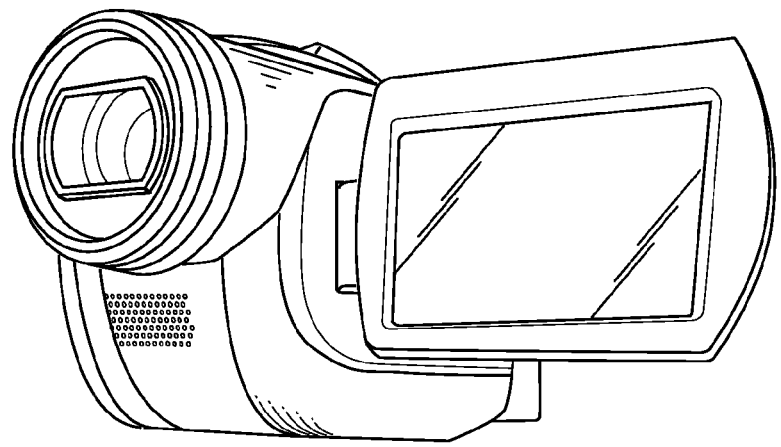
FIG. 7A is an external view of an example of a video camera.
Figure 7B:
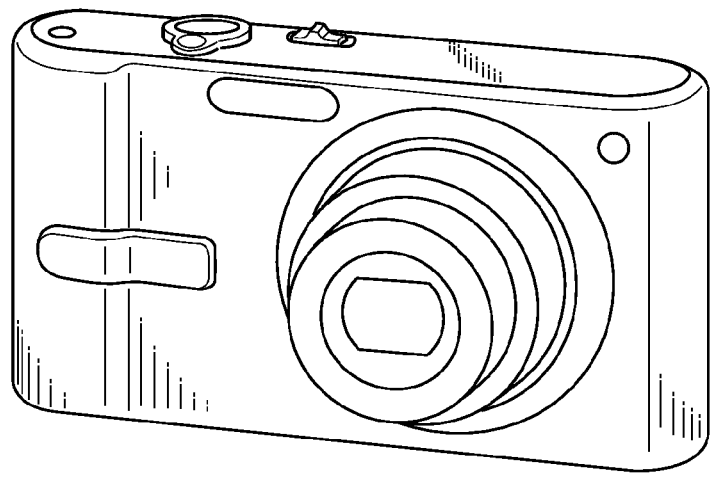
FIG. 7B is an external view of an example of digital still camera.

The solid-state imaging devices according to the above embodiments and variations are suitable as imaging devices (image input devices) in imaging apparatuses such as a video camera illustrated in FIG. 7A, a digital still camera illustrated in FIG. 7B, and a camera module for mobile devices including a mobile phone.

Figure 8:
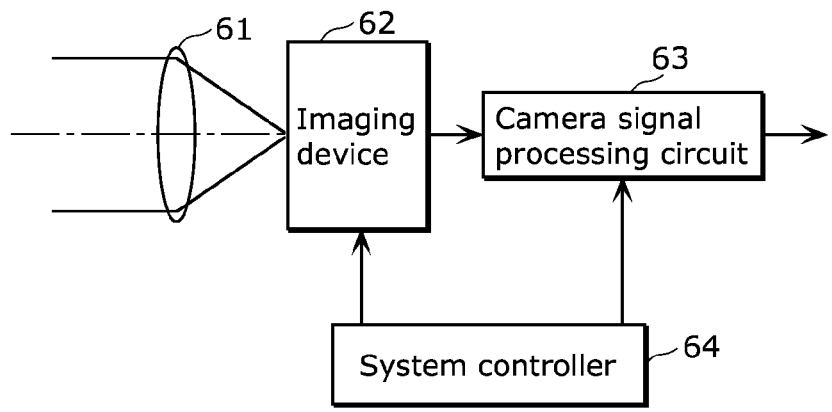
FIG. 8 is a block diagram illustrating a structure of an imaging apparatus according to Embodiment 3.
Figure 9:
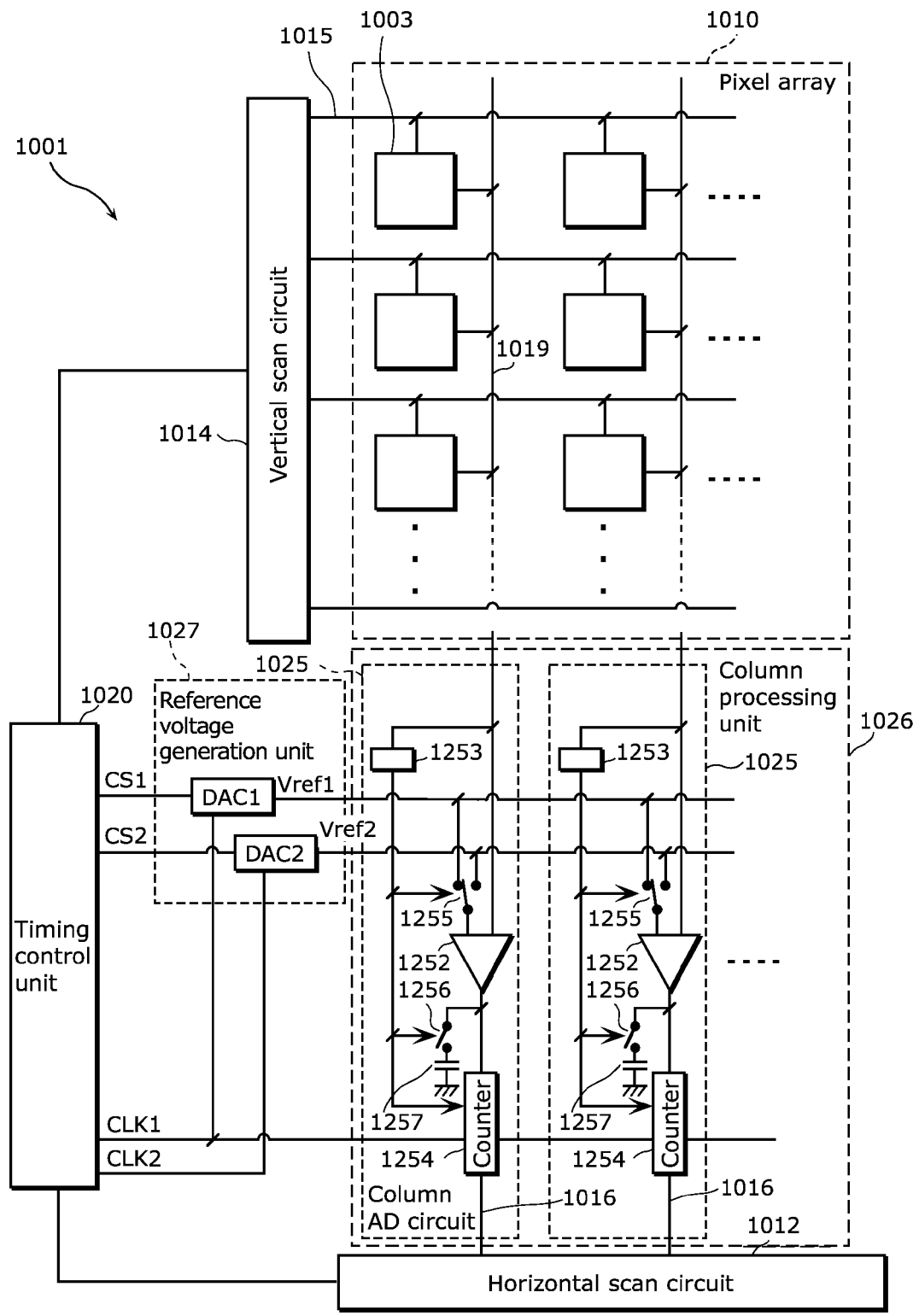
FIG. 9 is a block diagram illustrating a structure of a solid-state imaging device according to an prior art.

FIG. 8 is a block diagram illustrating an example of a structure of an image apparatus. As illustrated in FIG. 8, the image apparatus according to the present embodiment includes: an optical system including a lens 61; an imaging device 62; a camera signal processing circuit 63; a system controller 64; and the like. The lens 61 forms image of image light emitted from a subject, on an imaging area of the imaging device 62. The imaging device 62 converts the image light, which has been formed as the image by the lens 61, into electric signals for each pixel, thereby generating an image signal. The imaging device 62 is the solid-state imaging device according to any one of the above-described embodiments and variations.

The camera signal processing circuit 63 performs various signal processes on the image signal provided from the imaging device 62. The system controller 64 controls the imaging device 62 and the camera signal processing circuit 63.

Thus, the imaging apparatus according to the present embodiment includes the imaging device 62 capable of decreasing deterioration of image quality which is caused by noise.

Although the solid-state imaging device and the image apparatus according to the present disclosure have been described based on the above embodiments and variations, the present disclosure is not limited to the embodiments and variations. Those skilled in the art will be readily appreciate that various modifications and combinations of the structural elements in the different embodiments and variations are possible without materially departing from the novel teachings and advantages of the present disclosure. Accordingly, all such modifications and combinations are intended to be included within the scope of the present disclosure.

For example, the frequency band characteristics of the voltage comparison unit 15 are not limited to the narrow-band frequency characteristics and the broad-band frequency characteristics, but may be three different kinds of frequency band characteristics. In this case, it is possible that, in at least a part of a counting period for comparison for the base signal component Vrst, the band selection unit 20 selects frequency band characteristics except the broadest frequency band characteristics from among the various kinds of frequency band characteristics, and in at least a part of a counting period for comparison for the superimposed signal component Vrst+Vsig, the band selection unit 20 selects substantially the same frequency band characteristics as selected in at least the part of the counting period for comparison for the base signal component Vrst.

It is also possible that, in at least a part of a counting period for comparison for the base signal component Vrst and in at least a part of a counting period for comparison for the superimposed signal component Vrst+Vsig, the band selection unit 20 selects the first frequency band characteristics from among three or more kinds of frequency band characteristics, and in at least a part before the counting period for the comparison for the base signal component Vrst and in at least a part before the counting period for the comparison for the superimposed signal component Vrst+Vsig, the band selection unit 20 selects, from among the three or more kinds of frequency band characteristics, the second frequency band characteristics that are broader than the first frequency band characteristics.

It is further possible that, according to a result of determination made by the mode distinguishing circuit 50, in at least one operation mode not including the pixel signal addition operation, the band selection unit 20 selects the third frequency band characteristics from among three or more kinds of frequency band characteristics, and in the other mode including the pixel signal addition operation, the band selection unit 20 selects, from among the three or more kinds of frequency band characteristics, the fourth frequency band characteristics that are narrower than the third frequency band characteristics.

It is further possible that, according to a result of determination made by the mode distinguishing circuit 50, in at least one operation mode including the pixel signal averaging operation, the band selection unit 20 selects the third frequency band characteristics from among three or more kinds of frequency band characteristics, and in the other operation mode not including the pixel signal averaging operation, the band selection unit 20 selects, from among three or more kinds of frequency band characteristics, the fourth frequency band characteristics that are narrower than the third frequency band characteristics.

It is further possible that, according to a result of determination made by the mode distinguishing circuit 50, in the video capturing mode, the band selection unit 20 selects the third frequency band characteristics from among three or more kinds of frequency band characteristics, and in the still-picture capturing mode, the band selection unit 20 selects, from among the three or more kinds of frequency band characteristics, the fourth frequency band characteristics that are narrower than the third frequency band characteristics.

It should also be noted that the processing units in the solid-state imaging device according to each of the above-described embodiments and variations are typically implemented into a Large Scale Integration (LSI) which is an integrated circuit. These may be integrated separately, or a part or all of them may be integrated into a single chip.

The technique of integrated circuit is not limited to the LSI, and it may be implemented as a dedicated circuit or a general-purpose processor. It is possible to use a Field Programmable Gate Array (FPGA) that can be programmed after manufacturing the LSI, or a reconfigurable processor in which connection and setting of circuit cells inside the LSI can be reconfigured.

It should also be noted that at least a part of the functions and structures of the solid-state imaging devices according to the above-described embodiments and variations may be combined.

It should also be noted that all the numerical numbers used in the above disclosure are examples for explaining the present disclosure in detail, and the present disclosure is therefore not limited to the numerical numbers. Furthermore, the logical levels expressed as HIGH/LOW and the switching states expressed as ON/OFF are examples for explaining the present disclosure in detail. It is possible to produce the same effects as described in the present disclosure by using other combinations of logical levels or different combinations of switching states which are different from the examples in the present disclosure. It should also be noted that an n-type, a p-type, and the like of the transistors are examples for explaining the present disclosure in detail. It is possible to produce the same effects as described in the present disclosure by reversing the types. It should be noted that the connection relationship between the structural elements are examples for explaining the present disclosure in detail, and the present disclosure is therefore not limited to the connection relationship to achieve above-described functions.

It should be noted that dividing of the functional blocks in the block diagrams is an example. It is possible to implement a plurality of functional blocks into a single functional block, divide a single functional block into a plurality of blocks, or cause a part of function of a functional block to be performed by a different functional block. It should be noted that similar functions of a plurality of functional blocks may be performed by a single hardware or software in parallel or in time-sharing.

It should be noted that a MOS transistor is used in the above-described description, but any other kind of a transistor may be used.

It should be noted that the circuit structures illustrated in the above-described circuit diagrams are examples, and the present disclosure is not limited to the circuit structures. In other words, it is also possible to use not only the above-described circuit structures but also any other circuits achieving the functions characterized in the present disclosure. For example, the present disclosure includes a circuit structure in which an element such as a transistor, a resistance element, a capacitance element, or the like is connected to an element in series or in parallel as long as the circuit structure can provide the same function as that of the above-described circuit structures. In other words, the expression "connecting" in the above embodiments and variations is not limited to connection of two terminals (nodes) in series. It is also possible to connect two terminals (nodes) to each other via an element, as long as the same function as that in the present embodiments and variation can be produced.

INDUSTRIAL APPLICABILITY

The present disclosure is useful for solid-state imaging devices and imaging apparatuses, and useful in digital still cameras, digital video cameras, and the like in which, in particular, a high speed and high image quality are required.

The invention claimed is:

1. A solid-state imaging device comprising:
   a plurality of pixels arranged in rows and columns, each of the pixels converting received light into a signal voltage; and
   a column Analog-to-Digital (AD) conversion unit configured to convert the signal voltage to a digital signal,
   wherein the column AD conversion unit includes:
   a comparison unit configured to determine, as a comparison result, which is greater between a value of the signal voltage and a gradually changing value of a reference signal voltage;
   an up-down counting unit configured to (i) count, by one of down-counting and up-counting, a time period until the comparison result of the comparison unit is reversed if the signal voltage is a voltage of a base signal component of each of the pixels at a reset level, and (ii) count, by an other of the down-counting and the up-counting, a time period until the comparison result of the comparison unit is reversed if the signal voltage is a voltage of a superimposed signal component in which the base signal component is superimposed on a pixel signal component corresponding to an amount of light received by the each of the pixels, and
   the comparison unit has plural kinds of frequency band characteristics which are switchable.

2. The solid-state imaging device according to claim 1, further comprising
   a band selection unit configured to (i) select one kind of frequency band characteristics among the plural kinds of the frequency band characteristics, and (ii) cause the comparison unit to use the one kind of the frequency band characteristics, wherein the band selection unit is configured to (i) select, in at least a part of the time period counted for the base signal component, frequency band characteristics except broadest frequency band characteristics from among the plural kinds of the frequency band characteristics, and (ii) select, in at least a part of the time period counted for the superimposed signal component, frequency band characteristics which are substantially same as the frequency band characteristics selected in the at least the part of the time period counted for the base signal component.

3. The solid-state imaging device according to claim 2, wherein the band selection unit is configured to:
select a first kind of frequency band characteristics in the at least the part of the time period counted for the base signal component and in the at least the part of the time period counted for the superimposed signal component; and
select a second kind of frequency band characteristics which is broader than the first kind of frequency band characteristics in at least a part of a time period before starting the time period counted for the base signal component and in at least a part of a time period before starting the time period counted for the superimposed signal component.

4. The solid-state imaging device according to claim 2, further comprising
an operation mode distinguishing unit configured to distinguish a plurality of operation modes including at least one operation mode including a pixel signal addition operation by which a plurality of signal voltages converted in different pixels among the pixels are added together,
wherein the band selection unit is configured to, according to a result of the distinguishing of the operation mode distinguishing unit,
select a third kind of frequency band characteristics in the at least one operation mode including the pixel signal addition operation, and
select a fourth kind of frequency band characteristics which is narrower than the third kind of frequency band characteristics in an other operation mode not including the pixel signal addition operation among the operation modes.

5. The solid-state imaging device according to claim 2, wherein the pixels include amplification transistors, respectively, each of the amplification transistors outputting the signal voltage,
the solid-state imaging device further comprises an operation mode distinguishing unit configured to distinguish a plurality of operation modes including at least one operation mode including a pixel signal averaging operation by which at least two of the amplification transistors in the pixels are set to be simultaneously conductive,
wherein the band selection unit is configured to, according to a result of the distinguishing of the operation mode distinguishing unit,
select a third kind of frequency band characteristics in an other operation mode not including the pixel signal averaging operation among the operation modes, and
select a fourth kind of frequency band characteristics which is narrower than the third kind of frequency band characteristics in the at least one operation mode including the pixel signal averaging operation.

6. The solid-state imaging device according to claim 2, further comprising
an operation mode distinguishing unit configured to distinguish a plurality of operation modes including at least one of a video capturing mode and a still-picture capturing mode,
wherein the band selection unit is configured to, according to a result of the distinguishing of the operation mode distinguishing unit,
select a third kind of frequency band characteristics in the video capturing mode, and
select a fourth kind of frequency band characteristics which is narrower than the third kind of frequency band characteristics in the still-picture capturing mode.

7. The solid-state imaging device according to claim 1, wherein the comparison unit includes:
a comparison circuit that compares the signal voltage to the reference signal voltage;
a capacitance connected to a connection point between the comparison circuit and the up-down counting unit; and
a switch connected in series with the capacitance, thereby controlling a conductive state and a non-conductive state between an output terminal of the comparison circuit and the capacitance,
wherein the switch switches between the conductive state and the non-conductive state to switch the plural kinds of the frequency band characteristics.

8. The solid-state imaging device according to claim 1, wherein the comparison unit includes:
a differential comparison circuit that compares the signal voltage to the reference signal voltage;
a capacitance having an end connected to one of differential output terminals of the differential comparison circuit; and
a switch that controls a conductive state and a non-conductive state between an other one of the differential output terminals of the differential comparison circuit and an other end of the capacitance, and
wherein the switch switches between the conductive state and the non-conductive state to switch the plural kinds of the frequency band characteristics.

9. The solid-state imaging device according to claim 7, wherein the comparison unit further includes
a pre-charge unit configured to pre-charge the capacitance in blocking which is the non-conductive state of the switch.

10. An imaging apparatus comprising
the solid-state imaging device according to claim 1.

* * * * *